United States Patent
Hegde

(10) Patent No.: US 6,570,875 B1
(45) Date of Patent: May 27, 2003

(54) AUTOMATIC FILTERING AND CREATION OF VIRTUAL LANS AMONG A PLURALITY OF SWITCH PORTS

(75) Inventor: Gopal D. Hegde, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/172,723

(22) Filed: Oct. 13, 1998

(51) Int. Cl.⁷ ............................ H04L 12/28; H04L 12/56
(52) U.S. Cl. ............... 370/389; 370/392; 370/395.53; 370/395.32
(58) Field of Search ................. 370/389, 352, 370/353, 354, 356, 360, 390, 392, 396, 398, 395.3, 395.31, 395.42, 395.5, 395.53, 401, 413, 415, 417, 422, 428, 395.32, 432

(56) References Cited

U.S. PATENT DOCUMENTS

| | | | |
|---|---|---|---|
| 5,715,250 A | 2/1998 | Watanabe | 370/395 |
| 5,920,699 A | 7/1999 | Bare | 395/200.55 |

(List continued on next page.)

OTHER PUBLICATIONS

Douglas E. Comer and David L. Stevens, *Adress Discovery and Binding (ARP)*, Internetworking with TCP/IP, vol. II: Design, Implementation, and Internals, Chapter 4, 1994, pp.39–59.

(List continued on next page.)

Primary Examiner—Douglas Olms
Assistant Examiner—Phirin Sam
(74) Attorney, Agent, or Firm—Pillsbury Winthrop LLP

(57) ABSTRACT

In a method and apparatus for performing multiprotocol switching and routing, incoming data packets are examined and the flow (i.e., source and destination) with which they are associated is determined. A flow table contains forwarding information that can be applied to all the packets belonging to the flow. If an entry is not present in the table for the particular flow, the packet is forwarded to the CPU to be processed. The CPU can then update the table with new forwarding information to be applied to all future packets of the same flow. When the forwarding information is already present in the table, packets can be forwarded at wire-speed. A dedicated ASIC is preferably employed to contain the table, as well as the engine for examining the packets and forwarding them according to the stored information. Decision-making tasks are thus more efficiently partitioned between the switch and the CPU so as to minimize processing overhead. Processes executing on the CPU maintain information regarding filters, mirrors, priorities, and VLANs. Such information is further integrated with the flow table forwarding information when flows corresponding to the established filters, mirrors, priorities and VLANs are detected. Accordingly, filters, mirrors, priorities and VLANs can be automatically implemented when forwarding decisions are made, which implementation is done at wire speeds. According to another aspect, VLANs are automatically created and updated based on the automatic detection of multicast groups existing among the hosts connected to the ports of the switch. After such VLANs are established, broadcast packets destined for the detected multicast groups are forwarded only along ports whose hosts are members thereof, thereby preventing needless and burdensome traffic from congesting other network segments and host connection.

14 Claims, 14 Drawing Sheets

U.S. PATENT DOCUMENTS

| | | | | |
|---|---|---|---|---|
| 6,005,863 A | * | 12/1999 | Deng et al. | 370/392 |
| 6,047,325 A | | 4/2000 | Jain et al. | 709/227 |
| 6,091,725 A | * | 7/2000 | Cheriton et al. | 370/392 |
| 6,094,435 A | * | 7/2000 | Hoffman et al. | 370/414 |
| 6,128,298 A | | 10/2000 | Wootton et al. | 370/392 |
| 6,216,167 B1 | * | 4/2001 | Momirov | 709/238 |
| 6,243,758 B1 | * | 6/2001 | Okanoue | 709/238 |
| 6,246,680 B1 | * | 6/2001 | Muller et al. | 370/389 |
| 6,256,306 B1 | * | 7/2001 | Bellenger | 370/389 |
| 6,272,134 B1 | * | 8/2001 | Bass et al. | 370/390 |
| 6,331,983 B1 | * | 12/2001 | Haggerty et al. | 370/400 |
| 6,335,935 B2 | * | 1/2002 | Kadambi et al. | 370/396 |

OTHER PUBLICATIONS

Douglas E. Comer and David L. Stevens, *RIP: Active Route Propagation and Passive Acquisition*, Internetworking with TCP/IP, vol. II: Design, Implementation, and Internals, Chapter 18, 1994, pp. 355–379.

Keith Turner, *Is It a Switch or Is It a Router*, PC Magazine, Nov. 18, 1997.

* cited by examiner

US 6,570,875 B1

AUTOMATIC FILTERING AND CREATION OF VIRTUAL LANS AMONG A PLURALITY OF SWITCH PORTS

RELATED APPLICATION

This application is related to co-pending U.S. application Ser. No. 09/058,335, filed Apr. 10, 1998, and entitled, "Method And Apparatus For Multiprotocol Switching And Routing," commonly owned by the assignee of the present application, the contents of which are incorporated herein by reference.

BACKGROUND OF THE INVENTION

1. Field of the Invention

The present invention relates to packet switches and routers, and more particularly, to a switching and routing method and apparatus capable of automatically filtering flows of packets between switch ports allowing for creation of a high performance hardware assisted firewall for Intranet applications and automatically creating virtual LANs among switch ports. In addition, the present invention describes a mechanism to reserve bandwidth for end to end applications and provide guaranteed quality of service (QoS) for them.

2. Description of the Related Art

Packet switches and routers forward data packets between nodes in a network. However, securing machines and data from unauthorized access is fast becoming a very important issue for corporate networks. According to industry experts, more than 70% of breaking are internal (i.e. employees stealing sensitive information from their own company). Also HR department in a company would not want engineers to get access to payroll data. This has created a need for a high performance firewall to secure and separate different networks. In conventional routers, this is done by software which inspects every packet that is being routed and determines whether any filters have been configured for that session. This information is typically manually configured by a system administrator. However, the processing required to inspect packets and apply the appropriate filter significantly reduces the packets rate through the router. The rate further reduces if a large number of filters have been configured.

Multimedia networking (voice and video on LAN/WAN) requires Quality of Service guarantees. Protocols such as Resource Reservation Protocol (RSVP), Real Time Protocol (RTP), Real Time Control Protocol (RTCP) have been defined to provide these services on LANs/WANs. Underlying hardware however needs to support prioritization of traffic and bandwidth reservation for these protocols to operate. Network traffic contains normal and high priority data. A good switch should be able to prioritize traffic in such a way that while high priority traffic gets its share of bandwidth, low priority traffic does not starve completely. This is called Weighted Fair Queuing (WFQ). This invention describes mechanisms to provide these services in hardware.

Likewise, virtual LANs (VLANs) are often desired for controlling broadcast and multicast packet flows in computer networks. Broadcast and multicast packets are typically forwarded on all ports of a switch and each node connected to the switch will have to process such packets. Some switches allow system administrators to manually set up VLANs among groups of nodes such that broadcasts and multicasts from nodes belonging to one group are confined to that group. This reduces the number of packets that nodes on the switched network must process. However, much administrative overhead is required to create and maintain VLAN groups, and to assign and update memberships in the groups.

Accordingly, there remains a need in the art for a switching device that can support prioritization and QoS guarantees of network traffic and/or create VLANs automatically without any administrator intervention. The present invention fulfills this need.

SUMMARY OF THE INVENTION

An object of the invention is to provide a method and apparatus that can forward packets to their destination at high throughput rates without requiring substantial processing overhead.

Another object of the invention is to provide a method and apparatus that can both switch and route packets with the same minimal processing overhead.

Another object of the invention is to provide a method and apparatus that is capable of both switching and routing packets at wire speed.

Another object of the invention is to provide a method and apparatus that is capable of wire-speed switching and routing of packets that are associated with all possible Layer 2 and Layer 3 traffic protocols.

Another object of the invention is to provide a method and apparatus that provides wire-speed switching and routing functionality in a switched internetwork, but does not require reconfiguration of existing end stations or network infrastructure.

Another object of the invention is to provide a method and apparatus that provides wire-speed application of filters of flows between nodes in a switched internetwork.

Another object of the invention is to provide a method and apparatus that provides wire-speed application of mirrors of flows between nodes in a switched internetwork.

Another object of the invention is to provide a method and apparatus that provides wire-speed application of priorities for flows between nodes in a switched internetwork.

Another object of the invention is to provide a method and apparatus that enhances network security.

Another object of the invention is to provide a method an apparatus that reduces unnecessary network traffic.

Another object of the invention is to provide a method and apparatus that provides wire-speed switch and routing functionality while supporting application or network level filters for intranet security applications.

Another object of the invention is to provide a method and apparatus that provides wire-speed switch and routing functionality while supporting VLANs that are created automatically with no administrator intervention.

Another object of the invention is to provide a method and apparatus for wire speed switching and routing functionality while supporting bandwidth reservation.

Another object of the invention is to provide a method and apparatus for wire speed switching and routing functionality while supporting multilevel priority queueing.

Another object of the invention is to provide a method and apparatus for wire speed switching and routing functionality while supporting weighted fair queueing.

The present invention fulfills these objects, among others, by providing a method and apparatus for performing multiprotocol switching and routing. Incoming data packets are examined and the flow (i.e., source and destination) with which they are associated is determined. A flow table contains forwarding information that can be applied to the flow. If an entry is not present in the table for the particular flow, the packet is forwarded to the CPU to be processed. The CPU can then update the table with new forwarding information to be applied to all future packets of the same flow. When the forwarding information is already present in the table, packets can thus be forwarded at wire-speed. A high speed static memory is preferably used to contain the table. A dedicated ASIC is preferably used to implement the engine for examining individual packets and forwarding them according to the stored information. Decision-making tasks are thus more efficiently partitioned between the switch and the CPU so as to minimize processing overhead.

Information regarding filters, priorities, and VLANs is maintained by processes executing on the CPU and are programmed into the forwarding table for the hardware to apply when it detects a matching flow.

According to another aspect of the invention, Internet Group Management Protocol (IGMP) packets (for IP multicast control), Zone Information Protocol (ZIP) packets (for AppleTalk) and NetBios & DLC/LLC packets with multicast addresses are forwarded to the CPU by the hardware. The CPU can then create and update VLANs automatically for those multicast groups in the forwarding table with no administrator intervention. Once such VLANs are established, packets destined for the detected multicast groups are forwarded only on the ports whose hosts are members thereof, preventing needless and burdensome traffic from congesting other network segments and host connections.

A further aspect of the invention provides mechanisms for administrators to reserve bandwidths and assign priorities to traffic flows. Protocols such as RSVP can then be used to automatically reserve bandwidth for certain flows. This provides Quality of Service guarantees for traffic being switched.

BRIEF DESCRIPTION OF THE DRAWINGS

These and other objects and advantages of the present invention will become apparent to those skilled in the art after considering the following detailed specification, together with the accompanying drawings wherein.

DETAILED DESCRIPTION OF THE PREFERRED EMBODIMENTS

Figure 1:
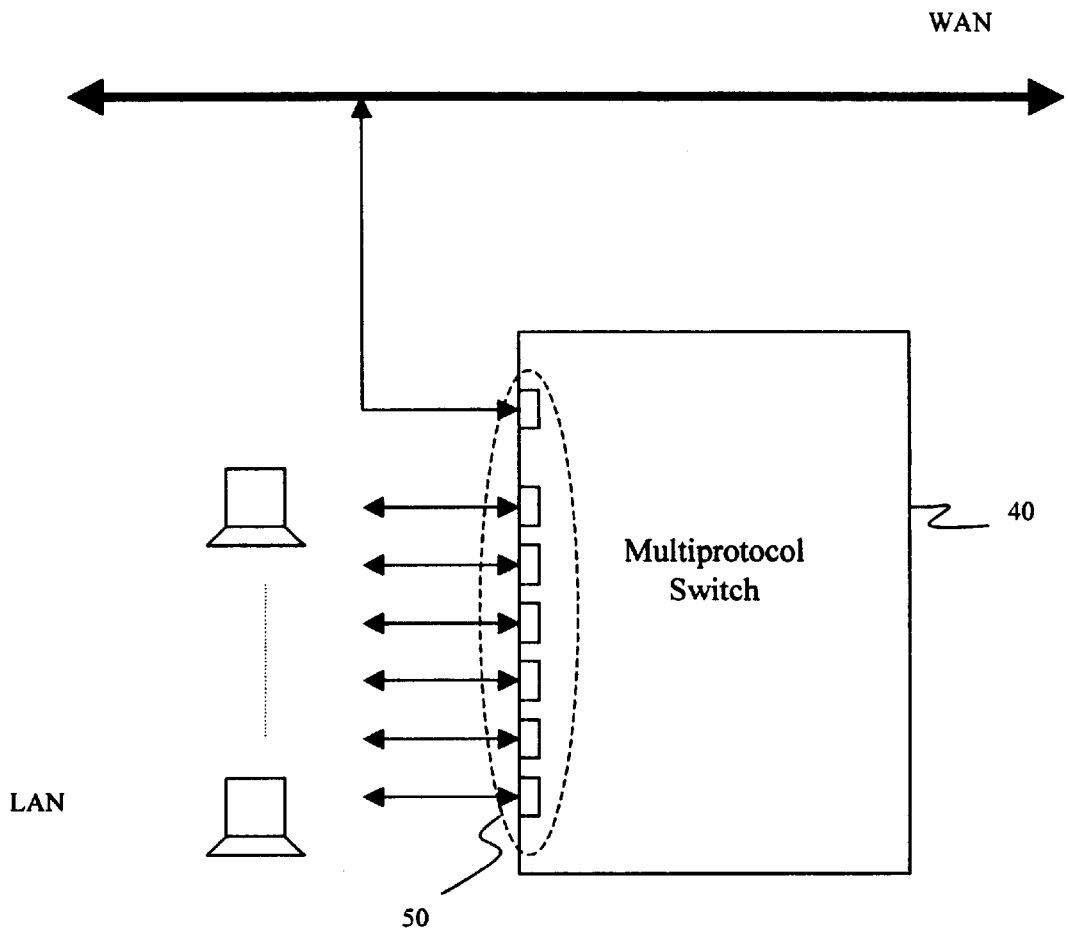
FIG. 1 is a block diagram illustrating a packet switching architecture in accordance with the present invention.

A device and method capable of performing wire-speed multiprotocol switching and routing of data packets between nodes in a network is described in the aforementioned related co-pending U.S. application Ser. No. 09/058,335. FIG. 1 is a block diagram illustrating a switch architecture in accordance with the present invention, which switch architecture is more fully described in the co-pending application. It includes a multiprotocol switch 40 having N input/output ports 50-1 ... 50-N. The input/output ports can be attached to nodes in a local area network (LAN) or they can be attached to different network segments or different networks in a wide area network (WAN) directly or via routers. As explained in more detail in the co-pending application, the multiprotocol switch has the ability to forward packets among and between local nodes and external networks attached to it at wire speeds, and in accordance with a plurality of Layer 2 and Layer 3 protocols.

Figure 2:
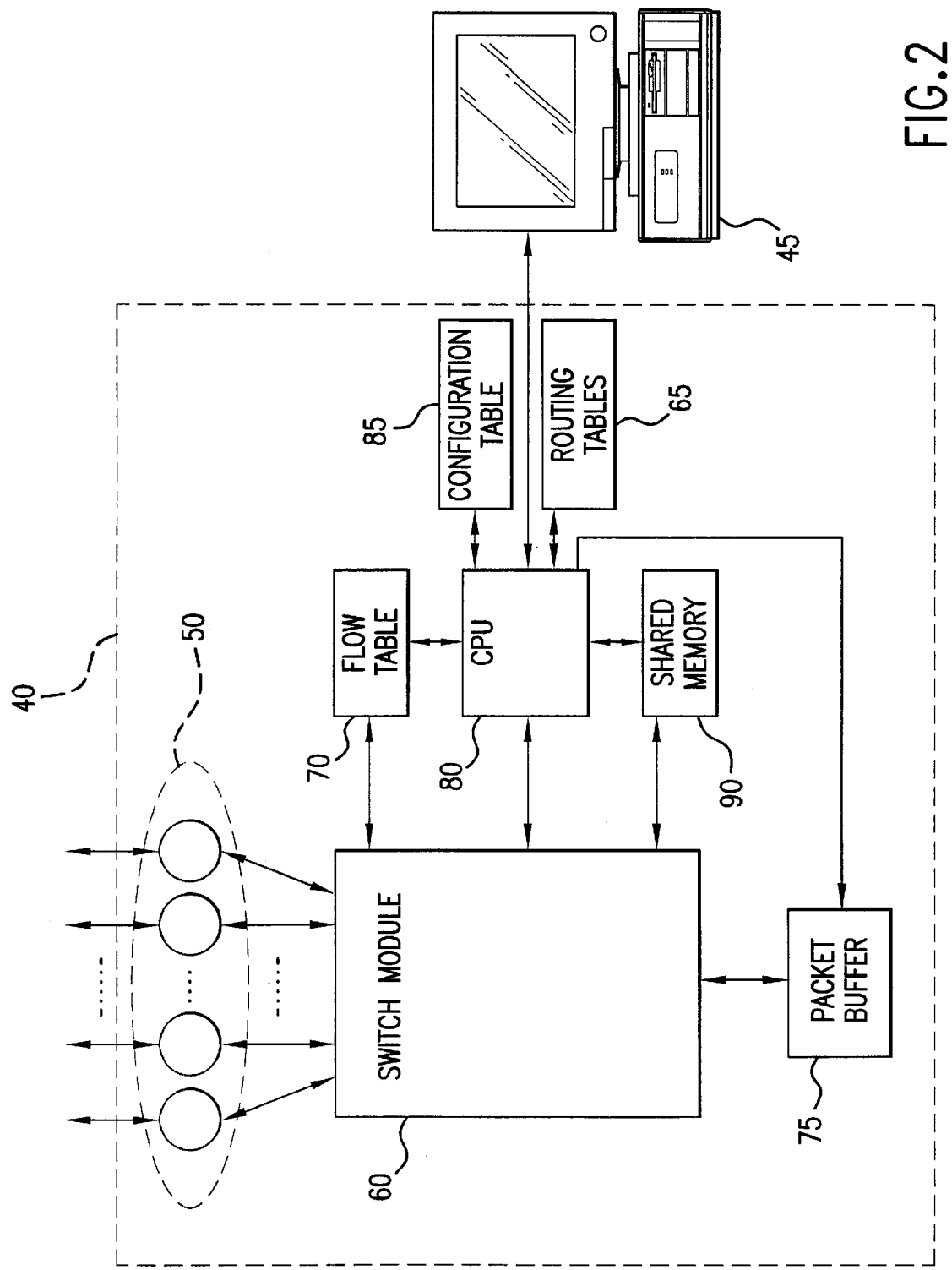
FIG. 2 is a block diagram illustrating a multiprotocol switch of the present invention in an architecture such as that illustrated in FIG. 1.

FIG. 2 further illustrates a multiprotocol switch 40 in accordance with the principles of the invention. In addition to input/output ports 50, it includes a switch module 60 and a flow table 70. Switch module 60 further communicates with a packet buffer 75, a CPU 80 and a shared memory 90. Flow table 70 and shared memory 90 are mapped memory spaces that are accessible by both switch module 60 and CPU 80. CPU 80 also communicates with a routing table 65, a configuration table 85 and a system administrator 45.

Although shown separately for clarity, switch module 60 and flow table 70 are preferably implemented together as an application specific integrated circuit (ASIC). Such an implementation permits data packets to be switched between ports 50 at wire speed in accordance with flows, filters and priorities specified in flow table 70. However, other specific implementations of switch module 60 and flow table 70 in accordance with the invention will be apparent to those skilled in the art after being taught by the following disclosures of their logical functions and data structures, for example.

CPU 80 can be implemented by a MIPS microprocessor made by IDT Inc. of Santa Clara, Calif., and shared memory 90 can be implemented by a fast static RAM (SRAM) such as that manufactured by ISSI. Packet buffer 75 for storing packets can be implemented using Synchronous DRAM (SDRAM) such as that manufactured by Samsung, Inc. CPU 80 partitions packet buffer 75 on a periport basis. The amount of memory allocated to each partition depends on port speed. So, for example, a gigabit port is allocated more memory than a 10/100 Mbps port.

Although not shown for clarity, it should be understood that CPU 80 includes program and data memory for storing programs that are executed by CPU 80 and data needed by those programs. Such data can include routing tables and the like. Programs executed by CPU 80 can include conventional routing update and costing functions implemented with known protocols such as Routing Information Protocol (RIP) for setting and maintaining conventional routing table information in routing tables 65, as well as processes for setting and maintaining system configuration information for the network in configuration table 85 in accordance with commands by system administrator 45, which system configuration information can include routing domains for example. Such conventional routing processes are in addition to the novel processes performed by the multiprotocol switch of the present invention that will be described in more detail below. However, a detailed description of such conventional processes will not be given so as not to obscure the invention.

Ports 50 are preferably RJ45 10/100 Mb ports, and can include port modules such as, for example, a 8×10/100 Mb port module (100 Base TX), a 1-Gigabit port module, or a 4×100 Base FX port module.

The term "routing domain" is used in this document to describe multiple ports (50-1 . . . 50-N) that belong to the same IP or IPX network. All the ports that belong to a routing domain have the same IP address and subnet mask or same IPX address. Each routing domain represents a virtual router port on the switch.

In the architecture shown in FIG. 2, data packets arrive at ports 50-1 . . . 50-N. As will be described in more detail below, switch module 60 continually monitors each of the ports for incoming traffic. When a data packet arrives, it checks the packet header for information that identifies the flow to which the packet belongs. For example, a flow of packets between two hosts in the network can be identified by the Ethernet and/or IP/IPX addresses of the hosts, and perhaps further by IP/IPX sockets and the protocol by which the hosts are communicating. This flow identification information is extracted from the header of each packet that traverses the network through the multiprotocol switch. IP/IPX data packets are buffered in packet buffer 75 while flow identification and forwarding processing is performed.

Software processes executing on CPU 80 handle interfacing with a system administrator 45 to retrieve, store and manage configuration information in configuration table 85. The software processes and interfaces can be implemented in many ways known to those skilled in the art, and so they will not be described in detail here so as not to obscure the invention. However, some of the contents of configuration table 85 should be noted. In addition to conventional system configuration information such as routing domains, this table includes information relating to filters, priorities, bandwidth reservations for applications and VLANs established between ports and hosts of the network.

Figure 3:
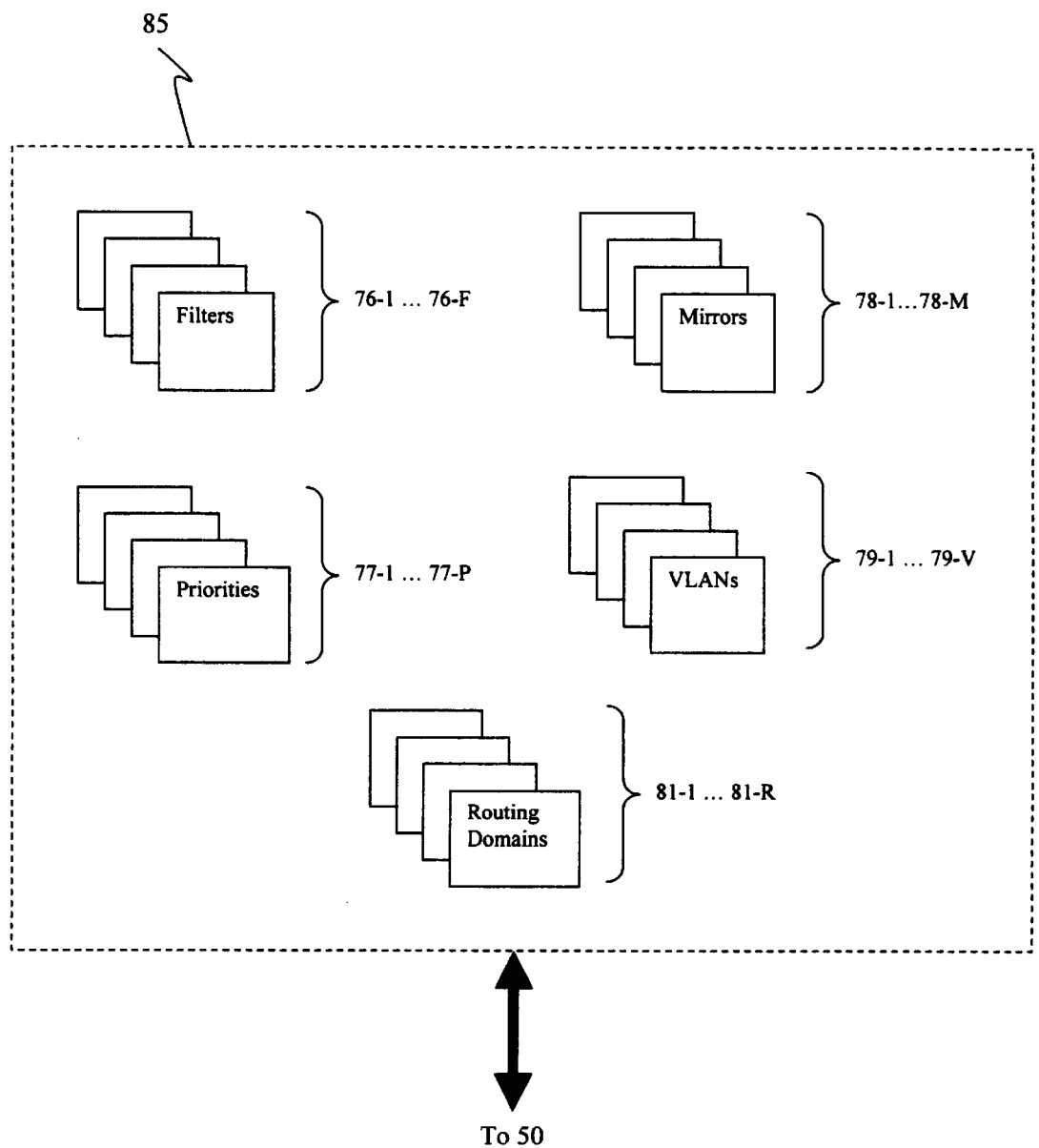
FIG. 3 is a block diagram illustrating a configuration table of the present invention in a multiprotocol switch such as that illustrated in FIG. 2.

As further illustrated in FIG. 3, in addition to routing domain settings 81-1 . . . 81-R, sets of filters 76-1 . . . 76-F, priorities 77-1 . . . 77-P, and mirrors 78-1 . . . 78-M, are maintained in configuration table 85. Also maintained in configuration table 85 is a list of VLANs 79-1 . . . 79-V, which list includes each established VLAN and the members thereof. Filters, priorities, mirrors and can be port-specific, host-specific, application-specific, or protocol-specific. That is, for example, a filter may be established between two ports of the switch (e.g. forbid any communication between ports A and B), between two hosts connected to ports of the switch (e.g. forbid any communication between host A having Ethernet address X, and host B having Ethernet address Y), between two applications running on hosts connected to ports of the switch (e.g. forbid any telnet sessions between hosts A and B), or between two hosts using a certain protocol (e.g. forbid ICMP communications between IP hosts A and B). When a priority level is assigned to a port, host, application or protocol, packets associated therewith are forwarded via a selected one of multiple priority queues, as will be described in more detail below. A mirror permits packets destined for one port, host or application to be duplicated and forwarded on one or more ports.

In addition to the VLANs automatically created and maintained by the present invention, as will be described in more detail below, the list of VLANs 79-1 . . . 79-V allows system administrators to manually create and maintain VLANs, or to disable automatic creation of VLANs, by the switch.

Routing domains 81-1 . . . 81-R contain the lists of routing domains established for the network and the members thereof. For example, a typical routing domain configuration for IP networks involves assigning ports to routing domains and specifying a separate IP address and subnet mask for each routing domain. For IPX networks, administrators need to configure an IPX network address and a frame type for the routing domain in addition to specifying ports that belong to the routing domain. Such configuration information for IP and IPX networks are maintained and updated by processes executing on CPU 80 and stored as routing domains 81-1 . . . 81-R in configuration table 85. Each individual port can belong to only one routing domain. In accordance with an aspect of the invention that will be described in more detail below, the routing domain configurations are used to automatically configure rules in flow table 70 such that IP and IPX flows of packets from nodes belonging to the same routing domain are switched at Layer 3+ at wire speed, while IP and IPX flows of packets from communicating nodes on different routing domains are routed at wire speed at Layer 3+.

Figure 4:
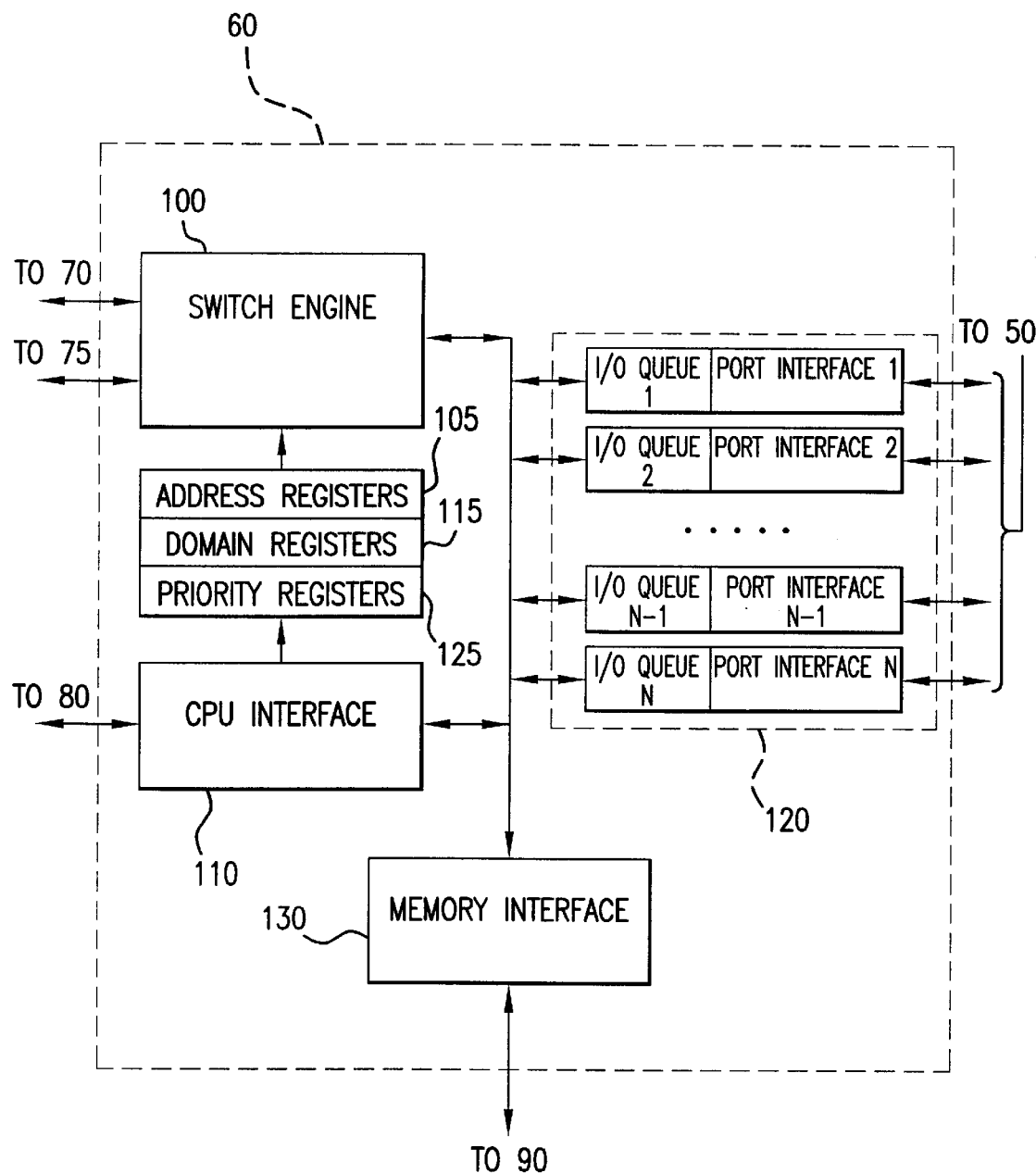
FIG. 4 is a block diagram illustrating a switch module of the present invention in a multiprotocol switch such as that illustrated in FIG. 2.

FIG. 4 further illustrates a switch module 60 in accordance with the architecture illustrated in FIG. 3. As can be seen, it includes switch engine 100, address registers 105, domain configuration registers 115, priority level configuration registers 125, CPU interface 110, port interfaces 120-1 . . . 120-N with associated I/O queues, and memory interface 130. As is further apparent from the figure, switch engine 100 accesses information contained in flow table 70, address registers 105, domain configuration registers 115 and priority level configuration registers 125, and manages packets buffered in packet buffer 75. CPU interface 110 communicates with CPU 80, thereby providing communication means between CPU 80 and switch engine 100, address registers 105, domain configuration registers 115, priority level configuration registers 125, port interfaces 120-1 . . . 120-N, and memory interface 130. Port interfaces 120-1 . . . 120-N respectively communicate with ports 50-1 . . . 50-N, and memory interface 130 manages access to shared memory 90. It should be noted that in this configuration, both switch engine 100 and CPU 80 (via CPU interface 110 and memory interface 130) can forward packets on ports 50-1 ... 50-N via port interfaces 120-1 ... 120-N and their associated I/O queues, although in the preferred embodiment, switch engine 100 can forward packets at wire speeds with no intervention from CPU 80.

Switch engine 100 performs the flow identification and processing operations for forwarding packets received via port interfaces 120-1 ... 120-N. It accesses flow table 70 to look up the forwarding information associated with the flows. Address registers 105 provide address information to assist switch engine 100 in locating appropriate flow processing information in flow table 70. The contents of these registers can be configured by CPU 80 via CPU interface 110, and include the base Ethernet address of ports 50-1 ... 50-N.

Domain configuration registers 115 provide routing domain configuration information in accordance with routing domains 81-1 ... 81-R established in configuration table 85. For each port, separate IP and IPX routing domain identifiers associated therewith are stored in domain configuration registers 115, which registers are configured by CPU 80 via interface 110. Routing domain configuration information for IP and IPX networks is maintained and updated by processes executing on CPU 80 and stored as routing domains 81-1 ... 81-R in configuration table 85. CPU 80 then uses this configuration information to configure domain configuration registers 115 via interface 110.

Although shown singly for clarity, the I/O queue associated with each of port interfaces 120-1 ... 120-N includes several queues, each having a corresponding priority level that can be configured by the software running on CPU 80. Switch engine 100 forwards packets destined for one of ports 50-1 ... 50-N using the appropriate queue, in accordance with priority rules configured in the flow table. The number of times in a service interval packets in each queue will be processed is programmed such that higher priority queues get serviced more frequently than lower priority queues. Each flow can be assigned a particular priority level, and thus have a desired QoS, as will be explained in more detail below. Priority level configuration registers 125 provide service level settings for each respective level of priority corresponding to the I/O queues associated with port interfaces 120-1 ... 120-N.

Figure 5:
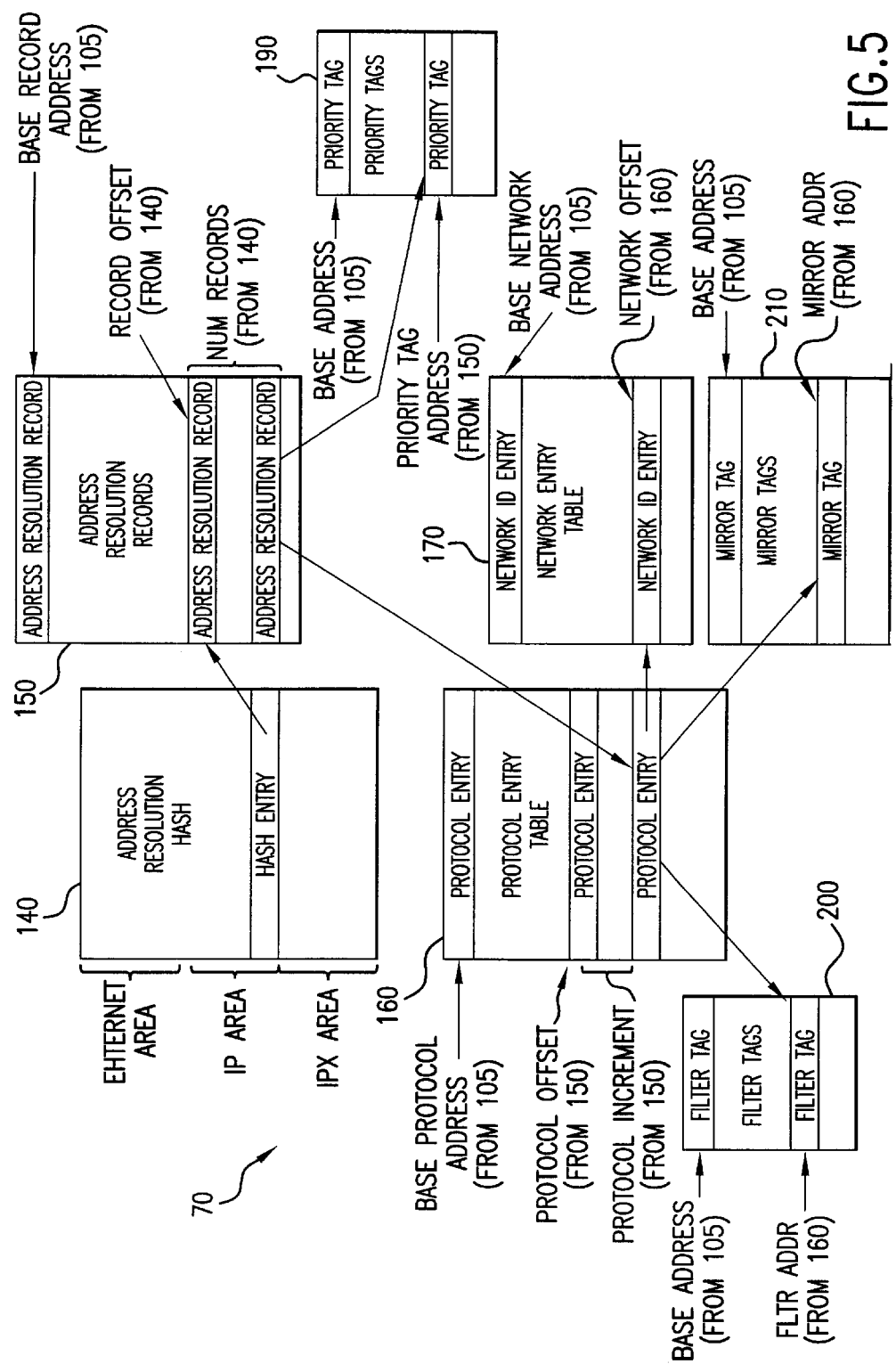
FIG. 5 is a block diagram illustrating a flow table of the present invention in a multiprotocol switch such as that illustrated in FIG. 2.

FIG. 5 further illustrates the contents of flow table 70. In this example, flow table 70 includes address resolution hash 140, address resolution record table 150, protocol entry table 160 and network entry table 170. Flow table 70 further includes priority tags 190, filter tags 200 and mirror tags 210. The contents of these tables, and their interrelations, will be described in more detail below in connection with the creation and maintenance of flow table entries according to the invention. Switch engine 100 has read access of the tables in flow table 70, and CPU 80 has read and write access to the tables.

The operation of the multiprotocol switch of the present invention will now be described in more detail with reference to FIGS. 6 to 14.

After powerup (step S2), and before any packets are received, flow table 70 is empty. Configuration table 85 contains routing domain, filter, mirror, priority, and VLAN configurations that have been established already for the network, and can be updated at any time by a system administrator via software processes executing on CPU 80.

Figure 6:
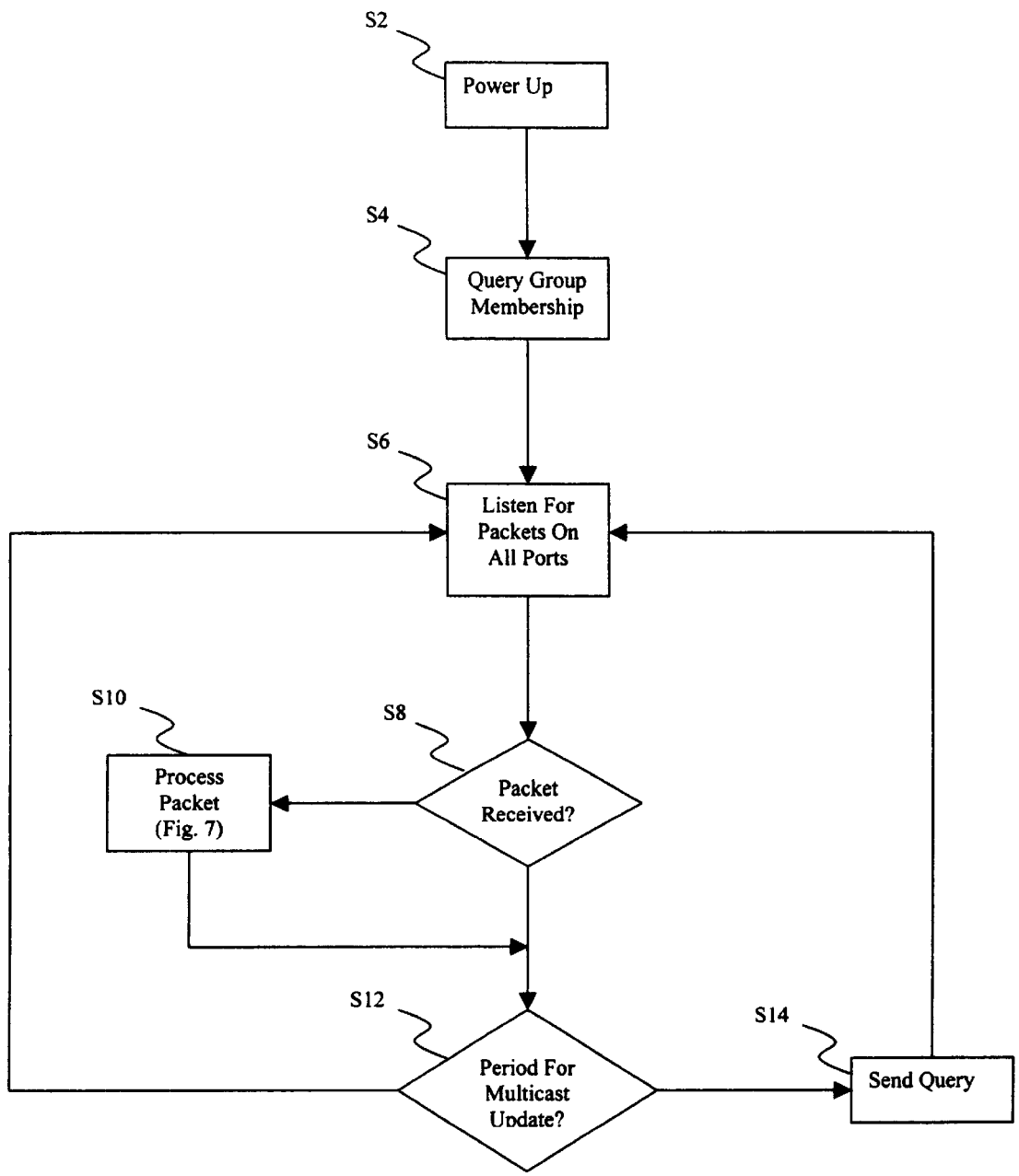
FIG. 6 is a flowchart illustrating a method used during operation of a multiprotocol switch according to the present invention.

In addition to switching and routing packets, the multiprotocol switch of the present invention performs tasks that are performed by conventional switches and routers such as route determination, routing table updates, and the like. Such tasks are well known to those skilled in the art and are not depicted in the overall operation of the switch, as illustrated in FIG. 6, so as not to obscure the invention. Of note, however, are the unique capabilities of the multiprotocol switch with respect to multicast group management for IP, AppleTalk and NetBios networks.

In accordance with an object of the invention, virtual LANs are automatically created for every IP multicast group associated with nodes and segments attached to the switch. Upon powerup (step S2), software processes executing on CPU 80 cause the multiprotocol switch to send out host membership query messages (IGMP messages addressed to 224.0.0.1) (step S4). Hosts attached to the switch that belong to multicast groups send IGMP host membership report messages. The switch can thus determine all the multicast groups to which nodes attached to it belong and forward IP multicast packets within multicast groups appropriately.

The switch then enters into an operational state wherein switch engine 100 continually monitors for data packets arriving on each of ports 50 via port interfaces 120-1 ... 120-N (step S6). When a packet is received (step S8), it is processed in accordance with the algorithm further illustrated in FIG. 7 (step S10). CPU 80 also periodically sends out IGMP queries (step S12 and step S14) to determine all active IP multicast groups to which hosts attached to the ports of the switch belong and keeps its multicast group table updated. Moreover, hosts send IGMP packets to join and leave IP multicast groups. These IGMP packets are intercepted by switch engine 100 and sent to CPU 80. CPU 80 can therefore have up to date information about IP multicast group membership.

Figure 7:
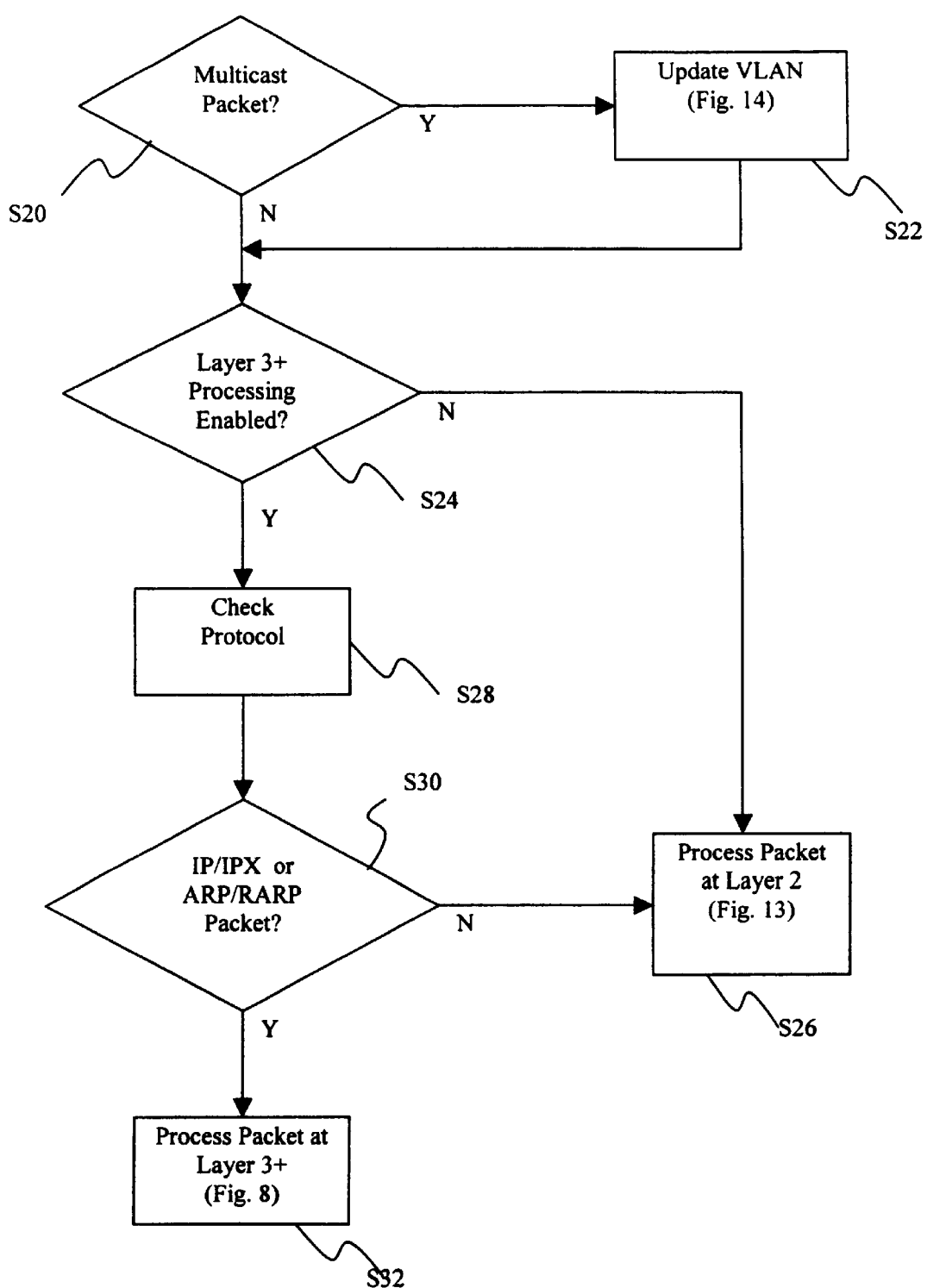
FIG. 7 is a flowchart illustrating a method used to process data packets received in a multiprotocol switch according to the present invention.

Packet processing and switching in the multiprotocol switch of the invention, that can be included in step S10 of FIG. 6 for example, is further illustrated in FIG. 7.

When a packet is received, switch engine 100 first examines the packet header and if the packet is a multicast packet (step S22), the packet is forwarded to CPU 80 for special processing to automatically create and/or update VLAN information (step S24). Whether or not it is a multicast packet, switch engine 100 keeps the packet for further processing.

Layer 3+ switching and routing can be disabled for the system by setting a flag in configuration table 85, for example. In that event, each packet traversing through the port is processed and switched as a Layer 2 packet, regardless of the protocol carried by the packet. Accordingly, if Layer 3+ switching and routing is disabled (as determined in step S24), processing branches to step S26.

All data packet headers include the source and destination Ethernet addresses of the packets. The protocol used by the communicating hosts can also be determined from the Ethernet data packet header. For example, Ethernet Type II packets contain a type field that explicitly indicates the protocol (such as IP, IPX, ARP, RARP and LAT) that packet belongs to. Moreover, it is known that different protocols use different Ethernet frame formats. For example, IP uses Ethernet II or SNAP packet formats. IPX can use all four Ethernet formats (depending on configuration), AppleTalk (a trademark of Apple Computer Corp., Cupertino, Calif.) uses the SNAP packet format and NetBios typically uses the Ethernet 802.2 LLC format. The protocol carried by the packet thus can be learned either explicitly or implicitly from the packet header.

Layer 4 protocols such as Transmission Control Protocol (TCP) and User Datagram Protocol (UDP) are built on top of the Layer 3 IP protocol. In addition to the information above, the headers for these protocols further contain source and destination socket numbers, which can identify individual applications such as FTP, Telnet, e-mail and HTTP, running on IP hosts. Specifically, the protocol carried field in the IP header identifies the protocol carried by the IP datagram. For example, if the protocol carried field has a value of 6, this indicates that the IP datagram carries a TCP packet, whereas a value of 17 indicates that a UDP packet follows the IP header.

The IPX protocol is also at Layer 3 of the OSI model. Most Novell NetWare (trademark of Novell, Inc. of Provo, Utah) applications run on top of IPX. IPX headers contain source and destination socket numbers which identify applications running on the hosts, in addition to IPX source and destination network and IPX source and destination node addresses, which identify end-to-end IPX hosts. Different Novell Netware Layer 4 protocols use the IPX datagram to send and receive packets. The protocol field in the IPX header indicates which protocol (SAP or RIP) the IPX datagram is carrying.

As evident from the foregoing, flows of packets associated with IP and IPX protocols can thus be identified by their IP/IPX source and destination node and/or socket information, and those associated with other protocols can be identified by their source and destination Ethernet addresses. In this example of the invention, flows of packets associated with IP and IPX protocols, as well as ARP and RARP packets, are processed by the multiprotocol switch to support special Layer 3+ processing and/or routing across different networks. Accordingly, as shown in FIG. 7, switch engine 100 determines the protocol type from the packet (step S28). As shown above, this may be explicitly defined in the header as in the Ethernet Type II type field or may be implicitly derived from other information in the IP or IPX header. If the packet is not an IP/IPX or ARP/RARP packet (determined in step S30), processing branches to step S26 and it is processed and switched as a Layer 2 packet, regardless of the protocol carried by the packet. Otherwise, processing advances to step S32 and the packet is processed in accordance with Layer 3+ protocols.

Figure 8:
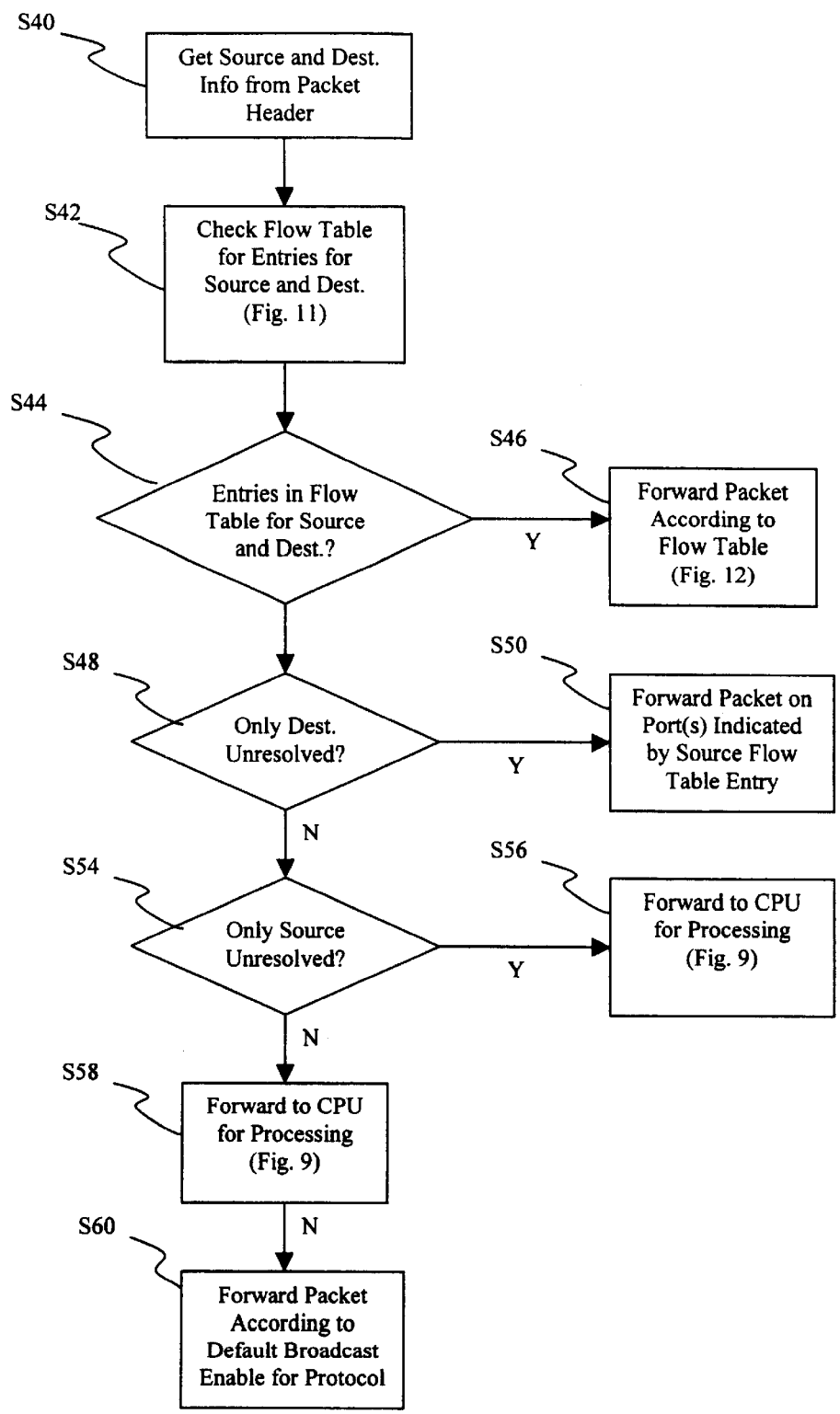
FIG. 8 is a flowchart illustrating a method used to process data packets according to Layer 3+ protocols in a multiprotocol switch according to the present invention.

FIG. 8 further illustrates switch engine processing of Layer 3+ packets, which processing can be included in step S32 of FIG. 7 for example.

Switch engine 100 first extracts the address information for both the source and destination ends of the flow with which the packet is associated (step S40). As shown above, headers of packets associated with IP and IPX protocols include IP/IPX source and destination node addresses and may further include socket numbers.

Switch engine 100 then checks to see whether entries exist in the flow table for both ends of the flow (step S42). If entries exists for both ends of the flow (determined in step S44), the packet is forwarded at wire speed in accordance with any filters, mirrors, priorities or VLANs established in the flow table entry (step S46).

If flow table entries do not exist for both ends of the flow, the packet is "unresolved." For unresolved IP/IPX and ARP/RARP packets, switch engine 100 forwards or broadcasts the packet as best it can under the circumstances. If only the destination end of the flow was unresolved (determined in step S48), a flow table entry exists for the source end of the flow, containing a broadcast enable entry for the source. Accordingly, switch engine 100 forwards the packet on the port(s) indicated by the broadcast enable entry associated with the source (step S56).

If only the source end of the flow is unresolved, a flow table entry exists for the destination. In this situation, switch engine 100 notifies CPU 80 via CPU interface 110 that the packet is unresolved (step S56). The message to the CPU contains the source and destination addresses (and possibly socket numbers), the port on which the packet arrived, and an indication that the'source end of the flow was unresolved. As will be described in more detail below, CPU 80 will process the packet, and if appropriate, will create entries in flow table 70 containing forwarding information and links to information relating to any previously-configured filters, priorities, mirrors or VLANs corresponding to the unresolved ends of the flow.

If both the source and destination ends of the flow are unresolved, switch engine 100 notifies CPU 80 via CPU interface 110 that the both ends of the flow were unresolved (step S58). Moreover, switch engine 100 forwards the packet on all ports indicated by the default broadcast enable entry for this protocol. As will be explained in more detail below, default entries exist for IP, IPX, and non-IP/IPX types of flows. Switch engine 100 can determine which ports on which to forward the packet according to the default broadcast enable entry, and causes the packet to be forwarded to a default I/O queue (typically one with lowest priority) associated with each of the indicated ports (step S60).

After the unresolved packet is broadcast or forwarded in steps S50 or S60, the destination node, if attached to the switch, will respond. The response packet will be processed as described above and a flow table entry for the responding node will be created by the CPU as in step S56. At that point, flow table entries for both ends of the flow will have been created so that any subsequent packets belonging to that flow will be forwarded by switch engine 100 at wire speed.

Figure 9:
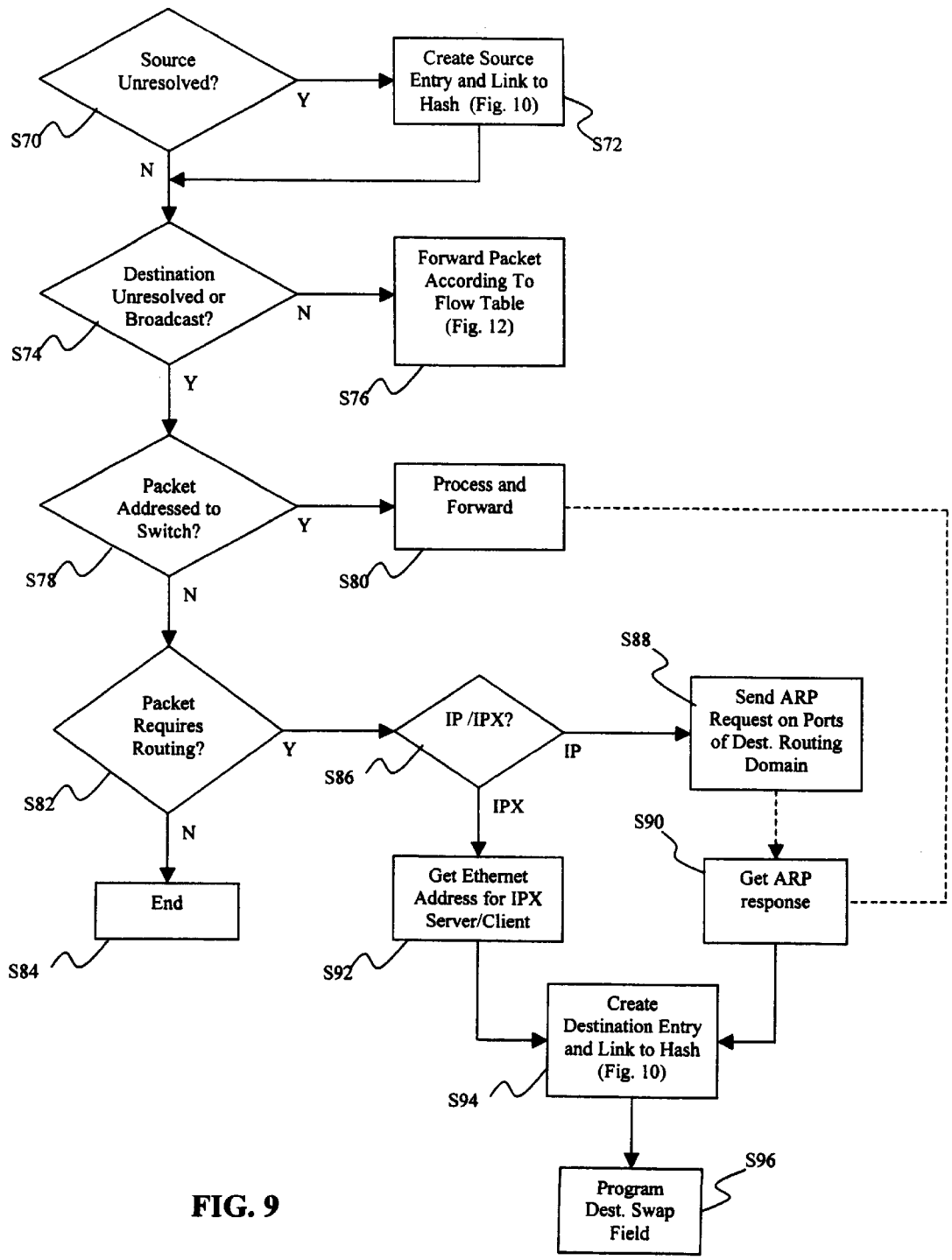
FIG. 9 is a flowchart illustrating a method used to process unresolved Layer 3+ data packets received in a multiprotocol switch according to the present invention.

CPU processing for unresolved IP/IPX or ARP/RARP packets, as initiated in step S48 of FIG. 8 for example, is further illustrated in FIG. 9.

First, CPU 80 determines whether the source of the flow is unresolved, from the message sent by switch engine 100 for example (step S70). If so, processing advances to step S72, where a flow table entry for the source of the flow is created by software executing in CPU 80, in accordance with any filters, mirrors, and priorities associated with the source node (that may have been configured by the network administrator) in flow table 70.

Processing then advances to step S74, where CPU 80 determines whether the destination of the flow is unresolved, from the message sent by switch engine 100 for example. If not, then the source was the only unresolved portion of the flow, and so the packet can be forwarded in accordance with the flow table information (step S76).

If the destination of the flow is unresolved, as determined in step S74, processing continues to step S78, where CPU 80 determines whether the packet is addressed to the switch. Such packets can include, for example, ARP packets from hosts that are attempting to get the Ethernet address of their IP gateway. Since the IP address of the gateway is actually associated with a port of the switch, such ARP requests must be processed by the switch and responded to appropriately by, for example, sending an ARP response back to the requesting host containing the Ethernet address of the gateway interface (step S80). Such packets can also include responses to ARP requests sent by CPU 80 to determine the Ethernet address of the host for programming the swap fields of a flow table entry, as will be described in more detail below in connection with the processing of steps S88 and S90. The dashed line connecting steps S80 and S90 in FIG. 9 thus represents the logical processing flow when an ARP request sent by CPU 80 in step S88 is responded to by the host at the requested IP node, which processing will be further described below.

If the destination of the flow is unresolved and the packet is not addressed to the switch, a flow table entry needs to be created for the destination of the flow. First, it must be determined whether the flow requires switching or routing. This is determined in step S62. If the destination Ethernet address of the packet is the Ethernet address of the port of the switch on which the packet arrived (as determined from address registers 105) and the destination IP or IPX address is not the IP/IPX address of the switch, then the packet needs to be routed. If the destination Ethernet address is not the Ethernet address of the port of the switch, CPU 80 further looks up the routing domains configured in tables 81-1 . . . 81-R in configuration table 85. If a packet is going from aport in one routing domain to a port in another routing domain, then the packet will require routing. Otherwise, it is switched. This is required to support IP multicast routing, as will be described even further below.

If it is determined in step S62 that the unresolved destination is in another network, the Ethernet address of the destination needs to be determined to perform routing. That is, during routing, switch engine 100 needs to replace the source Ethernet address in the packet with the Ethernet address of the switch port on which the packet is being forwarded, and the destination Ethernet address of the packet needs to be replaced by the Ethernet address of the destination node or the router en route to the destination. It is this destination Ethernet address that needs to be determined.

If the packet is an IP packet (as determined in step S86), CPU 80 determines the IP network that the destination belongs to and determines the port(s) that connect to or belong to that network. CPU 80 can do this, for example, by cross-referencing the destination IP address with the contents of routing table 65 (created statically by an administrator or dynamically learned using routing protocols such as RIP and OSPF). If no such network exists, CPU 80 sends an ICMP redirect message to the host indicating that the network was unreachable. If it finds an entry in routing table 65 for the network, CPU 80 sends an ARP request packet on all the ports belonging to that network (step S88). The destination or next hop sends an ARP response containing its Ethernet address. Switch engine 100 sends this response to CPU 80 (step S48 in FIG. 8). CPU 80 extracts the Ethernet address contained in the response packet, and records the port on which the packet arrived (step S80 and step S90). For further information regarding binding machine level addresses with network level addresses using ARP, see generally Douglas E. Comer and David L. Stevens, Internetworking with TCP/IP—Vol. II: Design, Implementation, and Internals, 1994, Chapter 4, pp. 39–59.

If the packet is an IPX packet that needs to be routed and its destination address is unresolved (as determined in steps S74 and S86), the Ethernet address of the destination is determined using IPX RIP information in routing tables 65 maintained by CPU 80 (if the destination is a Netware server). If the destination is a Netware client, then the destination Ethernet address is already known. In either event, the Ethernet address associated with the IPX destination address is determined in step S92. For further information regarding route determination and updating using RIP, see generally IPX Routing Guide, published by Novell Press.

CPU 80 then creates a flow table entry for the destination of the flow (step S94) and programs the Ethernet address swap field of the entry with the Ethernet address information determined in the preceding steps (step S96).

Figure 10:
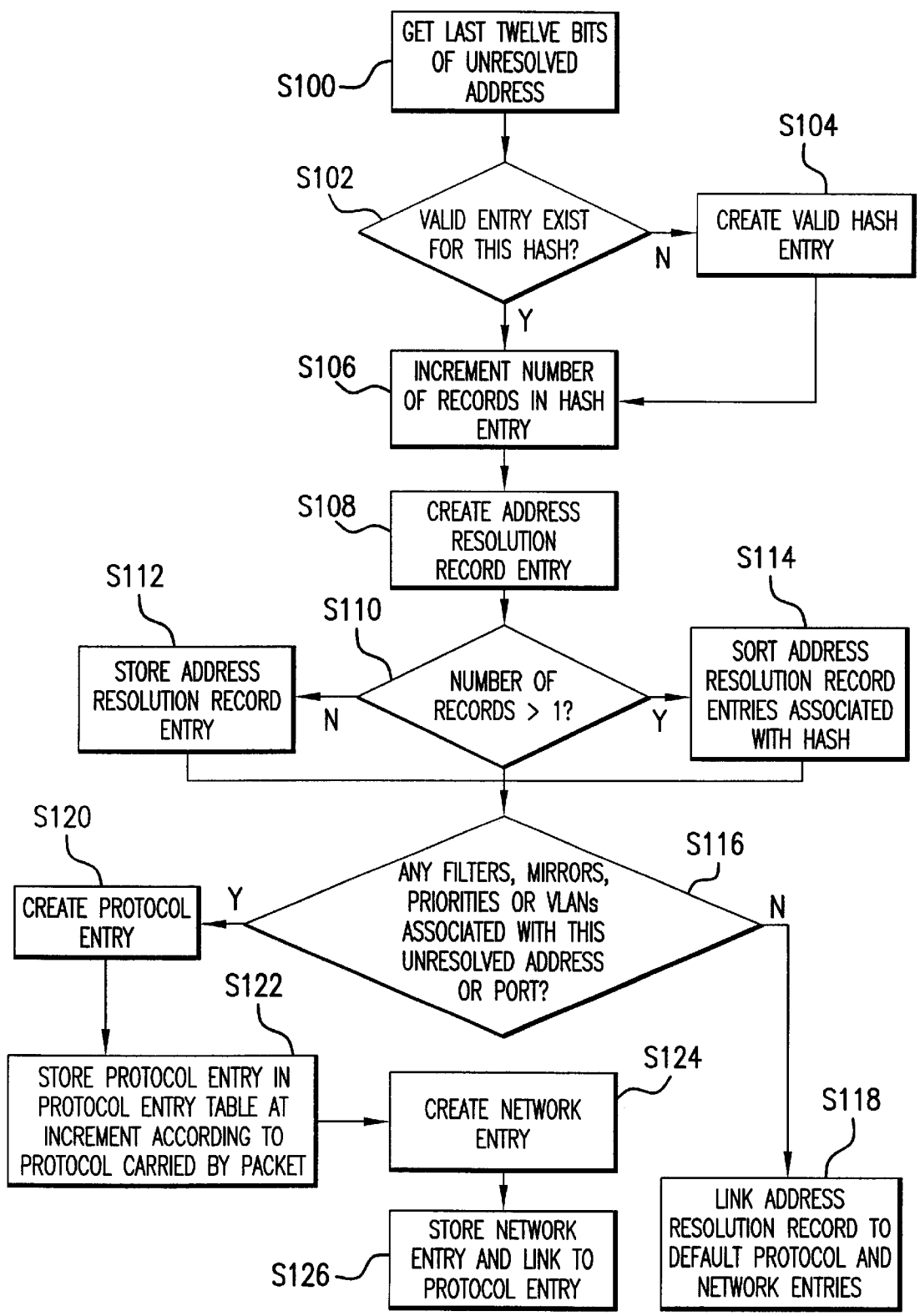
FIG. 10 is a flowchart illustrating a method used to create flow processing entries in a multiprotocol switch according to the present invention.

Processing for creating flow table entries for unresolved packets, as performed in steps S72 and S94 of FIG. 9 for example, is further illustrated in FIG. 10.

First, in step S100, CPU 80 extracts the last twelve (least significant) bits (0–11) of the Ethernet or IP/IPX address that could not be resolved by switch engine 100. CPU 80 uses these twelve bits as a hash into flow table 70 to determine whether an address resolution hash entry exists in address resolution hash table 140 for the unresolved address (step S102). The address resolution hash entry is used as a starting link for all forwarding and other packet processing information associated with the node corresponding to the unresolved address.

Separate hash areas are maintained for Ethernet, IP and IPX address tables. Each hash entry is 32 bits long and has a format as shown below (bit positions of each field shown in parentheses):

| Hash Accessed (31) | Record Offset (27–10) | Number of Records (9–2) | Record Link Valid (1) | No Entries Valid (0) |
| --- | --- | --- | --- | --- |

The Hash Accessed field indicates whether this hash has been accessed by switch engine 100. This field can thus be used to age out hashes using the Least Recently Used (LRU) algorithm, for example. Aging software executing on CPU 80 initially sets this bit on all the hash entries. When a node associated with this hash entry sends data on the network, switch engine 100 clears this bit. The aging software can later and/or periodically delete hash entries that do not have the Hash Accessed bit cleared.

The Record Offset field contains the address offset from the Base Record Address of address resolution record table 150 at which the first record entry for the group of addresses that map to this hash is stored. The first address resolution record entry associated with this hash will thus reside at location (Base Record Address+Record Offset). The Base Record Address is stored in a register within address registers 105. The Record Offset field is originally set to zero, but CPU 80 updates it with the offset of the address resolution record entry for this flow, after such entry is stored in address resolution record table 150, so as to link it to this hash entry.

The Number of Records field indicates the number of addresses (minus one) that the switch has learned map to this hash. This field is originally set to zero, but is updated when CPU 80 creates additional address resolution record entries that are linked to this hash.

The Record Link Valid field, when set, indicates that the data stored at location (Base Record Address+Record Offset+(Number of Records×2)+2) is actually a Link Entry. Since each hash can only point to 128 address resolution record entries (7 bit field), this bit can be used to increase the number of records for this hash value. If this bit is not set, and the No Entries Valid bit is also not set, then the data stored at (Base Record Address+Record Offset+(Number of Records×2)) is the last possible address resolution record for this particular hash entry.

The No Entries Valid bit indicates that there are no valid addresses that map to this hash. This bit is originally set, but is cleared when CPU 80 creates an address resolution record corresponding to this hash entry.

Accordingly, in step S102, when CPU 80 next determines whether a valid hash entry exists in address resolution hash 140 at the position corresponding to the twelve bits of the unresolved address, it inspects the No Entries Valid field of the entry. If the bit is set, CPU 80 clears it and all other bits in the entry, thereby creating a valid hash entry at the position in address resolution hash 140 corresponding to the unresolved address (step S104).

CPU 80 next increments the Number of Records field in the hash entry to indicate that an additional address resolution record entry for this hash will be created (step S106). If the number of records that will exist for this hash exceeds the field size of the Number of Records field, that field is decremented and the Record Link Valid field bit is set.

Processing advances to step S108, where CPU 80 creates an entry in address resolution record table 150 for the host corresponding to the unresolved address. The format of an address resolution record entry is shown below.

| Protocol Offset (31–18) | | | Ethernet Address bits 15–12, 23–16, 31–26 (17–0) OR IP/IPX Address bits 15–12, 23–16, 31–26 (17–0) |
|---|---|---|---|
| Port Number (31–23) | Priority Tag Addr (22–19) | Mirror Enable (18) | Ethernet Address bits 25–24, 39–32, 47–40 (17–0) OR IP/IPX Address bits 25–24 and Socket bits 0–15 (17–0) |

CPU 80 fills the Address fields with the remaining 36 bits of the unresolved address that were not used as the initial hash. For non-IP/IPX packets, CPU fills these fields with the remaining most significant bits of the Ethernet address contained in the unresolved entry message from switch engine 100. For IP and IPX packets, CPU 80 fills these fields with the remaining most significant bits of the IP/IPX address and the host application socket number. If no special configurations (filter, mirror or priority) have been configured for the host application, CPU 80 inserts a "don't care" value of hex 0xffff for the socket number to indicate that the socket number is not used to identify the IP/IPX flow with which this entry is associated. Moreover, if the protocol (such as ICMP, IGMP)carrying the packet does not use socket numbers a "don't care" value is used for the socket value.

The Port Number field indicates the port (50-1 . . . 50-N) on which this Ethernet (or IP or IPX) address resides. CPU 80 fills this field with the port number contained in the unresolved entry message from switch engine 100.

The Protocol Offset field indicates the offset from the Base Protocol Address at which the entries in the Protocol Table for each protocol associated with this flow are stored. The Base Protocol Address is stored in a register in address registers 105. The protocol the packet belongs to is used as an increment from the Protocol Offset to point to the appropriate entry. The increments for each protocol are stored in a register in address registers 105. The address of the entry in the Protocol Table for the flow associated with this address resolution record will thus be Base Protocol Address+Protocol Offset+Protocol Increment. If and when CPU 80 creates a protocol table entry for this flow, explained in more detail below, CPU 80 fills the Protocol Offset field to link the protocol entry to this address resolution record.

The Priority Tag Addr field provides the address to one of the 16 32-bit priority tags 190. The Base Address for priority tags 190 is stored in a register in address registers 105. Accordingly, the address to the priority tag field for this flow is located at Base Address+Priority Tag Addr. CPU 80 initially sets the Priority Tag Addr field to zero. If priorities are configured for this flow, as will be explained below, a priority tag will be configured, priority processing will be enabled by setting a bit in the Protocol Offset entry, and the address to the configured priority tag will be programmed in this field to link the priority tag to the address resolution record entry.

The Mirror Enable field qualifies the mirror tag (tag address found in the protocol entry). If this bit is set, mirror processing is enabled for this flow. CPU 80 initially sets this bit to zero. If mirrors are configured for the flow, as explained in more detail below, a mirror tag will be configured, and the mirrors will be enabled by setting this bit.

After creating the address resolution record for the unresolved portion of the flow, processing advances to step S100, where CPU 80 determines how many address resolution records now exist for this hash by examining the Number of Records field in the hash entry. If this is the first address resolution record entry created for this hash, CPU 80 simply stores the address resolution record entry it created in address resolution record table 150 at the address corresponding to Base Record Address+Record Offset (step S112). It then links this entry to the address resolution hash entry by storing the address offset from the Base Record Address where the entry is stored in the Record Offset field of the hash.

If it is determined in step S110 that there are more than one address resolution record entries for this hash, CPU 80 sorts the existing entries with the newly created entry in order of the remaining address bits of the unresolved flow address, and stores them accordingly (step S114). The entries are already linked to the address resolution hash entry by the previous programming of the Record Offset field.

Processing then advances to step S116, where CPU 80 determines whether any special processing has been configured or is otherwise required for this flow. This includes determining whether any filters, mirrors, priorities or VLANs are associated with this flow. CPU 80 does this, by cross-referencing the flow identification information in the unresolved packet with the entries in configuration table 85.

If it is determined in step S116 that no filters, mirrors, priorities, VLANs or swap addresses need to be programmed for this flow (i.e. routing is not configured for the switch), the address resolution record is linked to a default set of protocol entries which are all linked in turn to a default network entry (step S118). If this is a TCP, UDP or IPX packet with a socket number, the socket number portion of the remaining address bits in the address resolution record entry for this flow will be set to the "don't care" value of 0xffff. The default network entry will be described in more detail below.

Otherwise, if it is determined in step S116 that this flow requires special handling, unique entries in protocol table 160 and network table 170 for the flow must be created, and processing by CPU 80 continues by first creating a protocol entry (step S120).

The address pointed to by the Protocol Offset field of the address resolution record indexes a list of entries in protocol table 160. Different filters, mirrors and priorities can be established between two nodes and/or processes depending on the particular protocol used for communication between them. The protocol increment for the particular protocol (provided by address registers 105) points to the appropriate set of filters, etc. for the flow, as indicated by a 32-bit entry in the protocol table, having the following format:

| Fltr Addr (31–27) | Mirror Addr (26–23) | Filter Enable (22) | Priority Queue (21–19) | B/W (18–15) | Priority Enable (14) | Network Offset (13–0) |
|---|---|---|---|---|---|---|

The Fltr Addr field provides the address to one of the 32 32-bit filter tags 200. The Base Address for filter tags 200 is stored in a register in address registers 105. Accordingly, the address to the filter tag for this flow is located at Base Address+Fltr Addr. CPU 80 initially sets the Fltr Addr field to zero. If filters are configured for this flow, CPU 80 will create a filter tag in filter tags 200 and program the address of the tag within filter tags 200 in this field to link the configured filter tag to the protocol entry. CPU 80 determines whether any filters are configured for this flow by cross-referencing the filter tables 76-1 . . . 76-F in configuration table 85 with the flow identification information for this side of the flow.

Each 32-bit filter tag contains 8 bits of veto information and 24 bits of match information. CPU 80 configures filter tags for each side (source and destination) of the flow to be filtered. If packets belonging to the flow are to be blocked (as in firewalling), CPU 80 configures the filter tags for the source and destination sides of the flow so that their veto bits do not match and their match bits do match. For example, if a firewall is established between a first network having nodes A, B and C and a second network having nodes D, E and F, CPU 80 may configure the filter tags for nodes A, B and C such that they have match bits of 0x000001 and veto bits of 0x02, while nodes D, E and F are configured with filter tags having match bits of 0x000001 and veto bits of 0x03. Accordingly, nodes A, B and C will be able to communicate with each other, but not with nodes D, E and F, who are also able to communicate with each other. Now assume that node C in the first network is to be given the privilege of communicating with nodes in the second network. This can be done by changing its match bits to 0x000002. Now node C will be able to communicate with all nodes in both networks.

The Mirror Addr field provides the address to one of the 16 16-bit mirror tags 210. If the mirror enable bit in the address resolution record linked to this protocol entry is set, mirroring is enabled for flows to which this node belongs. The Base Address for mirror tags 210 is stored in a register in address registers 105. Accordingly, the address to the mirror tag for this node is located at Base Address+Mirror Addr.

CPU 80 determines whether any mirrors are configured for this flow by cross-referencing the mirror tables 78-1 . . . 78-M in configuration table 85 with the flow identification information for this side of the flow. If any of the established mirrors correspond to this flow, one of the 16 16-bit mirror tags 210 will be configured for it. Each mirror tag field contains 1 bit of match information. CPU 80 initially sets the Mirror Addr field to zero. If traffic belonging to the flow is to be mirrored on another port(s), CPU 80 sets the mirror enable bit in the address resolution entry for each end of the flow, configures a tag in mirror tags 210, and links both ends of the flow to the same tag by filling the Mirror Addr field of both respective protocol entries with the address of the configured tag in mirror tags 210 (offset from the Base Address). Switch engine 100 can thereafter locate the tag by combining the Mirror Addr field with the Base Address for mirror tags 210 which is stored in a register in address registers 105. The port(s) on which the flow is to be mirrored is configured in the Mirror Entry of the network entry linked to this protocol entry (described below).

The Priority Enable field qualifies the priority tag (addressed by the Priority Tag Addr in the address resolution record entry corresponding to this flow). If this bit is set, the flow is processed at a higher priority. CPU 80 initially sets this bit to zero. If priorities are configured for this flow, a priority tag will be configured, priority processing will be enabled by setting this bit, and the address to the configured priority tag within priority tags 190 will be programmed in the Priority Tag Addr field of the address resolution record entry linked to this protocol entry to link the priority tag to the address resolution record entry.

CPU 80 determines whether any priorities are configured for this flow by cross-referencing the priority tables 77-1 . . . 77-P in configuration table 85 with the flow identification information for this side of the flow. If any of the established priorities correspond to this flow, a priority tag will be configured for it. Each priority tag contains 1 bit of match information. If packets belonging to the flow are to be forwarded with priority, CPU 80 enables priority by setting the Priority Enable field in the protocol entries of both ends of the flow, configures a priority tag in priority tags 190, and links the address resolution records of both ends of the flow to the same configured priority tag. The level of priority associated with this flow is determined by the Priority Queue field and the service level for that queue programmed in priority configuration registers 125.

The Priority Queue field is valid if the Priority Enable bit is set for the flow. CPU 80 initially sets this field to zero. If a priority is configured for this flow, CPU fills this field with the priority level with which all packets belonging to this flow will be forwarded by the switch. For example, if eight levels of priority are supported, there will be eight I/O queues associated with each port 50-1 . . . 50-N, and this field will indicate which one of the queues into which packets belonging to this flow will be placed.

Each queue's corresponding priority level is user configurable. That is, a system administrator can program the number of times per service interval a queue having that priority level should be serviced on a system wide basis. This configuration is stored in priority level configuration registers 125. One such register exists for each priority level/queue. For example, if a value of 5 is programmed into priority configuration register for priority level 4, the queue corresponding to that priority level will be serviced 5 times in a service interval. The service interval is determined by adding together all the priority level values programmed into each priority configuration register. Weighted Fair Queueing is implemented by servicing the queues with equal priority after servicing the queues in accordance with established priorities (i.e. after all the queues are serviced per the priorities in priority level configuration registers 125, service queue 1, once, queue 2 once and so on until all the queues are serviced). This ensures that even the lowest priority queues are serviced once every service interval.

After creating the protocol entry for this unresolved portion of the flow, CPU 80 stores the entry in protocol entry table 160 at the Protocol Increment associated with the protocol used by the hosts of this flow, which increment is referenced to the Protocol Offset for this flow. Then CPU 80 links the protocol entry with the address resolution record entry for this flow by writing the Protocol Offset from the Base Protocol Address where this record is stored in the Protocol Offset field in the address resolution record entry (step S122).

Processing advances to step S124, where CPU 80 creates an entry in network entry table 170 for this unresolved portion of the flow. The Network Offset field points to an entry in network entry table 170 associated with this flow and protocol. The base address of the entry will be Base Network Address+Network Offset. The Base Network Address is stored in a register in address registers 105.

Entries in network entry table 170 contain fields that help configure virtual LANs, fields to configure mirroring, and fields to store the destination Ethernet address values to swap out the ones in the packet if the packet is being routed. At least one network entry exists for every address resolution table entry. However, multiple address resolution entries can share the same network entry. For example, a default network entry exists for every IP, IPX and non-IP/IPX flow that has no associated filters, mirrors, priorities or VLANs configured for it, as will be described in more detail below. Accordingly, for example, all such non-configured IP flows will have address resolution entries that point to the same default protocol entry that in turn points to the same default network entry. The format of each network entry is shown below:

| | Broadcast Enable Entry (31–0) | |
|---|---|---|
| | Reserved (31–0) | |
| Unused | Reserved (16–24) | Swap Address Bits 15–0 (15–0) |
| | Swap Address Bits 47–16 (31–0) | |
| | Mirror Entry (31–0) | |

The Broadcast Enable field is used to control the ports on which broadcast and multicast packets, originating from this node should be forwarded. This field contains 1 bit of match information corresponding to each port of the switch (32 ports in this example). A 1 in any bit position indicates that a broadcast packet from the node associated with that Broadcast Enable field must be forwarded on that port. For example, if bits 13 and 14 in this field are set, then broadcast or multicast packets from a node having a network entry containing this field will be sent out on ports 14 and 15. CPU 80 initially sets this field to a default value based on the protocol and routing domain associated with the node. Accordingly, broadcasts and multicasts originating from a node will only be forwarded on ports with attached nodes belonging to the same routing domain, if such a routing domain exists. If the node belongs to a VLAN configured on or learned by the switch, CPU 80 sets this field appropriately to make sure that multicasts are forwarded only on ports belonging to that VLAN. For example, if nodes attached to ports 1 and 2 belong to the same VLAN, then the broadcast enable field for those nodes will be 0x00000003 indicating that multicast packets from nodes on those ports should be sent out only on ports 1 and 2.

Every attached node learned by the switch has a network entry containing an associated 32 bit Broadcast Enable field. Separate default network entries having default Broadcast Enable fields are created for each of the IP, IPX and non-IP/IPX protocols. These default network entries are used for nodes that do not have filters, mirrors, priorities or VLANs configured for them. Respective "dummy" protocol entries are further provided to link between unique address resolution record entries and the default network entries. The default Broadcast Enable field of the default network entry to which non-IP/IPX flows are linked is set to 0xffffffff indicating that broadcasts must be forwarded on every port. The default Broadcast Enable fields of the default network entries to which IP and IPX flows are linked are configured based on routing domains. For example, if there are two IP routing domains comprised of ports 1 through 15 and 16 through 32 respectively, then there will be one default network entry for each routing domain. The first one is associated with all nodes learned on ports 1 through 15 and will have a Broadcast Enable field containing 0x0000ffff. The second is associated with all nodes learned on ports 16 through 32 and will have a Broadcast Enable field containing 0xffff0000. This ensures that broadcasts from nodes in IP routing domain 1 will not be sent to nodes in IP routing domain 2 and vice versa.

When a flow has one or more of a filter, mirror, priority or VLAN configured for it, non-default protocol and network entries will be created for it. When creating the network entry for the node, however, CPU 80 first copies the Broadcast Enable field of the default network entry associated with this flow into the Broadcast Enable field for the newly created network entry.

CPU 80 determines whether any VLANs are configured for this flow by cross-referencing the VLAN tables 79-1 . . . 79-V in configuration table 85 with the flow identification information for this side of the flow. If any VLANs are established the node associated with this side of the flow belongs to any of the established VLANs, a non-default network entry will be configured for it. CPU 80 configures the Broadcast Enable field in accordance with the established VLAN by setting the bits corresponding to the port(s) on which each node belonging to the VLAN is attached.

The Mirror Entry field indicates the ports on which the packets belonging to the flow associated with this network entry should be mirrored on. CPU 80 initially sets these fields to zero. As described above, if mirrors are configured for the flow to which this packet belongs, CPU 80 sets the Mirror Enable bit for both sides of the flow, configures a mirror tag and points both sides of the flow to the same mirror tag, and configures the Mirror Entry by setting the bits corresponding to the port(s) on which packets are to be mirrored on.

The Swap Address Bits fields contains the Ethernet addresses used for address swapping during packet routing. For IP and IPX routing, the swap field bits are filled in with the Ethernet address associated with the destination node as described above. When routing a packet, the switch needs to replace the source Ethernet address with the address of the port through which the packet is being forwarded and the destination Ethernet address in the packet to be routed with the address of the next hop router or the end station. Every node that communicates across networks has a unique network entry associated therewith. The swap field of the network entry is filled by CPU 80 with the Ethernet address of the next hop router or the end station as described above in connection with the processing depicted in FIG. 9. The Ethernet address is determined at the time of entry creation using Address Resolution Protocol (ARP) for IP packets.

After creating the network entry as described above, CPU 80 stores it in network entry table 170, then links it to the protocol entry for this portion of the flow by writing the Network Offset relative to the Base Network Address where it is stored in the protocol entry (step S126).

The flow table entry creation processing described above will now be further described by way of the following illustrative and non-limiting examples of the invention.

First, assume that a system administrator sets up a routing domain for a group of users in a network containing a multiprotocol switch of the present invention, for example, the engineering department of a company. Further assume that these users are connected to ports 1–8 of the switch and that they have been configured with IP addresses in the range 206.233.77.0 to 206.233.77.255, so that the associated IP network is 206.233.77.0 (subnet mask 255.255.255.0).

Once an administrator configures ports 1–8 to belong to routing domain 1 (network address 206.233.77.0), CPU 80 creates a default network entry for that domain in network entry table 170, having a Broadcast Enable field value of 0x000000ff, indicating that broadcasts from any of the nodes attached to ports 1–8 will be sent out only on ports 1–8. CPU 80 then locates an empty space in protocol table 160 sufficient to contain entries for all supported protocols and creates dummy protocol entries that all point to the default network entry for routing domain 1 created in the previous step.

If a user connected to port 1 of the switch wishes to open an FTP session with a user connected to port 2 of the switch, and if this is the first communication between them, there will be no flow table entries for this flow, and the processing depicted in FIG. 10 will be performed for both, the host connected to port 1 and the host connected to port 2 one at a time.

The first packet of the flow is unresolved and is sent to CPU 80 for further processing. CPU 80 creates hash table entries in the IP area of address resolution hash 140 at positions corresponding to the last twelve bits of the IP address of both respective hosts, and clears the No Entries Valid fields in both entries (steps S102 and S104).

Next, CPU 80 creates address resolution record entries in address resolution record table 150, fills the Address fields with the remaining address bits and a "don't care" value of 0xffff for the socket bits, and fills the Port Number fields with the respective port numbers. CPU 80 links the newly created address resolution record entries to the address resolution hash entries by programming the Record Offset fields in the hash entries with the offsets of the address resolution record entries from the Base Record Address in the address resolution record table (steps S108–S112).

CPU 80 determines that no mirrors, filters, priorities or VLANs are associated with this flow, and that no routing is required (step S116). Accordingly, the default protocol and network entries can be used (step S118). CPU 80 links the dummy protocol entry for TCP to both address resolution record entries by programming the Protocol Offset fields of both address resolution record entries with the base address of the dummy protocol entries located in protocol table 160, which dummy protocol entries all point to the default network entry for routing domain 1.

In a next example, assume that a system administrator establishes a firewall that forbids any communications between hosts having Ethernet address A and Ethernet address B, respectively connected to ports 8 and 9 of the switch. This filtering information is stored in filter tables 76-1 . . . 79-F in configuration table 85 and specifies the Ethernet addresses, but not the ports.

If the host having Ethernet address A wishes to send a non-IP/IPX packet to the host having Ethernet address B, and if this is the first attempted communication between them, there will be no flow table entries for this flow, and the processing depicted in FIG. 10 will be performed for both hosts one at a time.

CPU 80 creates hash table entries in the Ethernet area of address resolution hash 140 at positions corresponding to the last twelve bits of Ethernet address A and B for the hosts connected to ports 8 and 9, respectively, and clears the No Entries Valid fields of both entries (steps S102 and S104).

Next, CPU 80 creates address resolution record entries in address resolution record table 150, fills the Address fields with the remaining bits of Ethernet address A and B for the host connected to port 8 and 9, respectively, and fills the Port Number fields with the respective ports (8 and 9). CPU 80 links the newly created address resolution record entries to the address resolution hash entries by programming the Record Offset fields in the hash entries with the offsets of the respective address resolution record entries from the Base Record Address in the address resolution record table (steps S108–S112).

CPU 80 then determines that a filter is associated with this flow by comparing the Ethernet addresses of both hosts with the filter set up in configuration table 85, so further processing is required (step S116). CPU 80 first locates empty spaces in protocol table 160 sufficient to contain entries for all supported protocols and creates respective protocol entries in the spaces at an offset predetermined for Ethernet protocol (step S120). This offset is also programmed in a register in address registers 105. Initially, all bits in the protocol entries are cleared. However, since a filter is associated with this flow, CPU 80 sets up filter tags in filter tags 200 and links the filter tags to the respective protocol entries by programming the Fltr Addr fields of the tags with the offsets of the respective tags in filter tags 200.

CPU 80 establishes a filter between the two hosts by setting the veto bits in their respective filter tags to different values and by setting the match bits to the same values. After the flow table entries for this flow have been created, all non-IP/IPX packets between the two hosts will be dropped by switch engine 100. If IP or IPX communications between these hosts are attempted in the future, similar processing will be performed to create IP or IPX flow table entries which will also cause switch engine 100 to drop all packets for such communications.

CPU 80 then links the protocol entries to the address resolution record entries by programming the Protocol Offset fields of the address resolution record entries with the base addresses of the respective empty spaces located in protocol table 160 (step S122).

Next, CPU 80 creates network entries and clears all bits in them (step S124). The Broadcast Enable fields are programmed with a value of 0xffffffff since no VLANs or routing domains have been configured. Finally, CPU 80 links the network entries by programming the Network Offset fields in the protocol entries with the offsets of the respective network entries from the base of network entry table 170 (step S126).

In a next example, assume that a system administrator establishes a priority for all HTTP communications with hosts belonging to an IP subnet being respectively connected to ports 4–7 of the switch. This priority information is stored in one of priority tables 77-1 . . . 77-P in configuration table 85 and specifies the IP network addresses, protocol type and priority level, but not the ports to which the hosts are attached.

An IP host connected to the switch that wishes to access an external Web site uses the default gateway to connect to it. The multiprotocol switch implementing the present invention will act as the default gateway. It will have routing tables established (through traditional routing protocols such as RIP and OSPF) to determine which port (16, for example) will provide the best route to the destination Web site and the port through which the flow should be forwarded. If this is the first attempted communication between the host and the Web site, there will be no flow table entries for this flow, and the processing depicted in FIG. 10 will be performed for both sides of the flow one at a time.

CPU 80 creates hash table entries in the IP area of address resolution hash 140 at positions corresponding to the last twelve bits of the IP addresses of the respective hosts, and clears their No Entries Valid fields (steps S102 and S104).

Next, CPU 80 creates address resolution record entries in address resolution record table 150, fills the Address fields with the remaining IP address bits and the socket numbers for both nodes, and fills the Port Number fields with the respective ports. CPU 80 links the newly created address resolution record entries to the address resolution hash entries by programming the Record Offset fields in the hash entries with the offsets of the respective address resolution record entries in the address resolution record table (steps S108–S112).

CPU 80 then determines that a priority is associated with this flow by comparing the IP addresses and protocol with the priority set up in configuration table 85, so further processing is required (step S116). CPU 80 first locates empty spaces in protocol table 160 sufficient to contain entries for all supported protocols and creates protocol entries in the spaces at an offset predetermined for TCP protocol (since HTTP uses TCP as a transport protocol) (step S1120). This offset is also programmed in a register in address registers 105. Initially, all bits in the protocol entries are cleared. However, since a priority is associated with this flow, CPU 80 creates a tag in Priority Tags 190 having bits corresponding to the ports of the respective hosts set, sets the Priority Enable bits in the protocol entries and programs the Priority Tag Addr fields in the address resolution record entries for both ends of the flow with the address of the newly created priority tag. Since the priority tags match, bidirectional priority is established for the flow. CPU 80 also programs the Priority Queue fields with the I/O queue corresponding to the priority level configured for the flow in priority tables 77-1 . . . 77-P. All packets belonging to that flow are then queued in the programmed queue number and are serviced a number of times per service interval as specified by the priority configuration register 125 for that queue (which CPU 80 has already programmed in accordance with a priority level to service level mapping).

(CPU 80 then links the protocol entries to the address resolution record entries by programming the Protocol Offset fields of the address resolution record entries with the base addresses of the respective empty spaces located in protocol table 160 (step S122).

Next, CPU 80 creates network entries and clears all bits (step S124). The Broadcast Enable fields are programmed in accordance with any routing domains or VLANs established (i.e. all ports that belong to the same routing domain have the same broadcast enable field and should send broadcast packets to each other). Since packets belonging to this flow will require routing, swap fields need to be programmed with the destination or next hop Ethernet address. CPU 80 uses Address Resolution Protocol (ARP) to determine these addresses and fills in the Swap Address bits fields accordingly. Finally, CPU 80 links the network entries by programming the Network Offset fields in the protocol entries with the offsets of the respective network entries from the base of network entry table 170 (step S126).

In a final example, assume that a system administrator establishes a mirror so that all Telnet sessions between IP host A and IP host B, respectively connected to ports 4 and 5 of the switch, are mirrored on port 1. This mirror information is stored in one of mirror tables 78-1 . . . 78-M in configuration table 85 and specifies the IP addresses and process (the socket for Telnet is 23) and mirror port, but not the ports to which the hosts are attached.

If host A wishes to initiate a Telnet session with host B, and if this is the first attempted communication between them, there will be no flow table entries for this flow, and the processing depicted in FIG. 10 will be performed for both hosts one at a time.

The packet will be sent to CPU 80 as an unresolved flow. CPU 80 creates hash table entries in the IP area of address resolution hash 140 at positions corresponding to the last twelve bits of the IP addresses of the respective hosts, and clears the No Entries Valid fields (steps S102 and S104).

Next, CPU 80 creates address resolution record entries in address resolution record table 150, fills the Address fields with the remaining IP address bits and socket bits, and fills the Port Number, fields with the respective ports. CPU 80 links the newly created address resolution record entries to the address resolution hash entries by programming the Record Offset fields in the hash entries with the respective offsets of the address resolution record entries in the address resolution record table (steps S108–S112).

CPU 80 then determines that a mirror is associated with this flow by comparing the IP addresses with the mirror set up in configuration table 85, so further processing is required (step S116). CPU 80 first locates empty spaces in protocol table 160 sufficient to contain entries for all supported protocols and creates protocol entries in the spaces at an offset predetermined for IP protocol (steps S120 and S122). This offset is also programmed in a register in address registers 105. Initially, all bits in the protocol entries are cleared. However, since a mirror is associated with this flow, CPU 80 creates a tag in Mirror Tags 210 having bits corresponding to the ports of the respective hosts set, sets the Mirror Enable bit in the address resolution record entries and programs Mirror Addr fields for both protocol entries with the address of the newly created mirror tag in Mirror Tags 210 to create bidirectional mirroring for the flow.

CPU 80 then links the protocol entries to the address resolution record entries by programming the Protocol Offset fields of the address resolution record entries with the base addresses of the respective empty spaces located in protocol table 160 (step S122).

Next, CPU 80 creates network entries and sets up the bits in the Broadcast Enable fields in accordance with any routing domains and VLANs established. Since a mirror is required for packets in both directions of the flow, the Mirror Entry fields of both network entries should be programmed. CPU 80 sets bit 0 in the fields so switch engine 100 will send traffic from A to B and B to A to port 1 in addition to the ports associated with A and B. Finally, CPU 80 links the network entries by programming the Network Offset fields in the protocol entries with the offsets of the respective network entries from the base of network entry table 170 (step S126).

Figure 11:
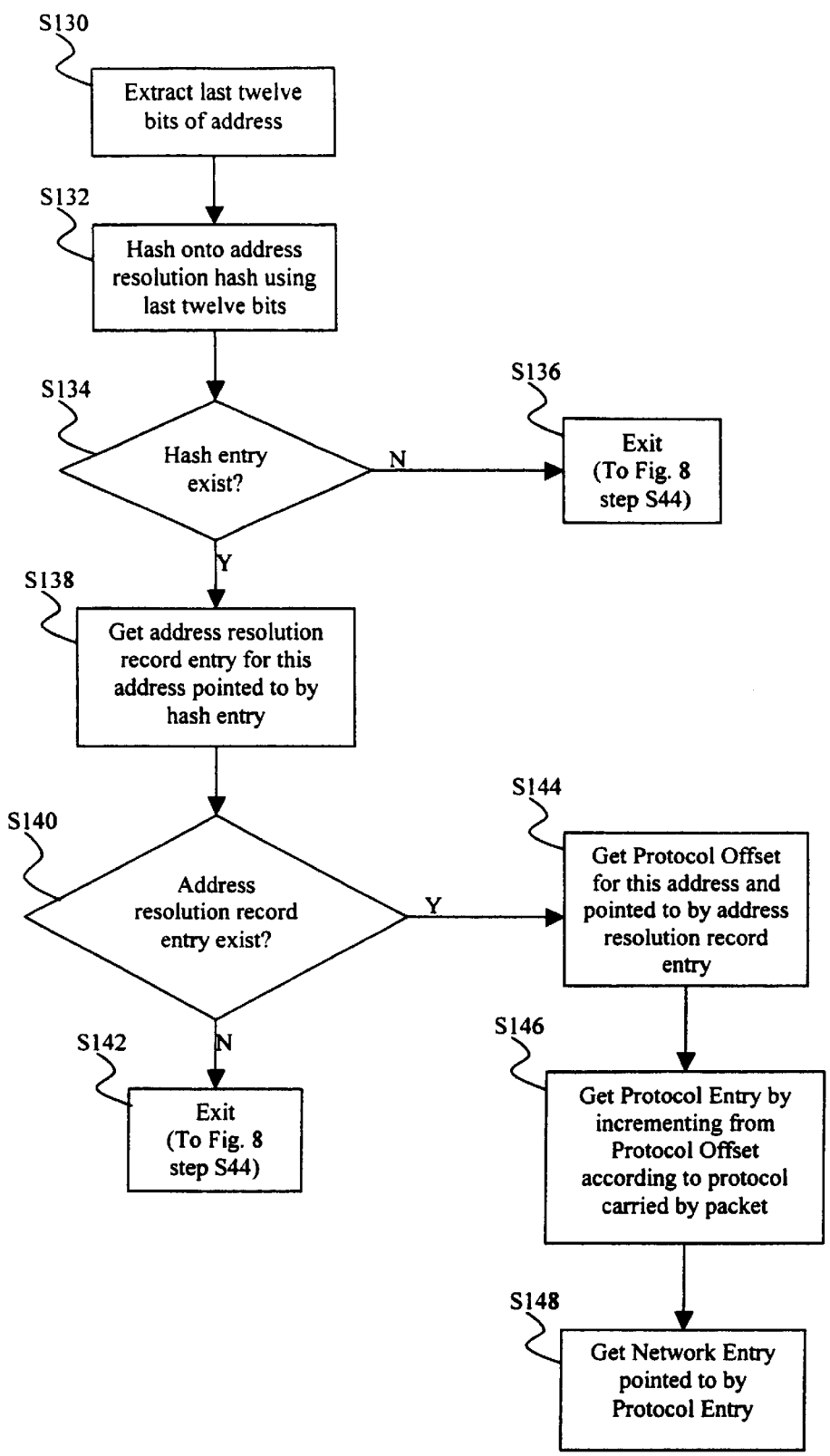
FIG. 11 is a flowchart illustrating a method used to resolve flow processing information according to flow identification information contained in data packets processed in a multiprotocol switch according to the present invention.

FIG. 11 further illustrates address resolution processing performed to determine whether packet processing information exists in flow table 70 associated with the flow to which the packet belongs, which processing can be performed in step S42 of FIG. 8 for example.

As shown in FIG. 11, switch engine 100 first extracts the last twelve bits of the address associated with the unresolved end of the flow. For IP and IPX packets for which Layer 3+switching and routing is enabled, the last twelve bits of the IP/IPX address are extracted in step S130; for other protocols, the last twelve bits of the Ethernet address are extracted.

The extracted bits are then used to hash onto the area of address resolution hash 140 corresponding to the protocol carried by the packet (IP, IPX or other) (step S132). If an entry exists in address resolution hash 140 for the flow (determined in S134), processing advances to step S138. Otherwise, address resolution processing ends with a negative result and packet processing control branches to step S44 in FIG. 7 (step S136).

In step S138, switch engine 100 locates in address resolution record table 150 the address resolution record that is linked to the hash entry found in the previous step. This is done by combining the Base Record Address contained in address registers 105 with the Record Offset field contained in the hash entry.

Processing advances to step S140, where it is determined whether an address resolution record entry exists for this end of the flow. If the number of records linked to the hash entry is only one, switch engine 100 can readily locate the address resolution record because the record entry is pointed to by combining the Base Record Address from address registers 105 with the Record Offset indicated in the hash entry as is done in the previous step. If, however, the number of linked address resolution records is more than one (denoted by a value in the Num Records field of the hash entry being greater than zero), switch engine 100 performs a binary search on the linked entries based on the remaining bits of the address from which the twelve bits were extracted. For IP/IPX packets, the entry may contain socket numbers along with addresses (a "don't care" socket value of 0xffffh in an entry matches all socket numbers).

If an address resolution record does not exist for the particular flow (determined in step S140), address resolution processing ends with a negative result and packet processing control branches to step S44 in FIG. 8 (step S142).

As described above, the address resolution record identifies one of the ports (50-1 . . . 50-N) to which the host associated with this side of the flow is connected. It also may contain links to entries in protocol entry table 160, and thence to network entry table 170 that can alert switch engine 100 to any filters, priorities, mirrors and VLANs that are configured for the flow.

In step S144, the Protocol Offset field of the address resolution record for this flow is extracted. This field, combined with the Base Protocol Address provided by address registers 105, points to a list of protocol entries for this flow in protocol entry table 160. Different protocol entries may exist for the flow depending on the protocol carried by the packet. To get the protocol entry for this flow and protocol, switch engine 100 extracts the protocol carried by the packet and looks up the Protocol Increment associated with the protocol in address registers 105. This increment is used to point to a particular entry in the list of entries pointed to by the Protocol Offset field in the preceding step, and the protocol entry is thus obtained in step S146.

A pointer to a linked entry in network entry table 170 can be contained within the protocol entry. To get the network entry for this flow and protocol, switch engine 100 obtains the Base Network Address from address registers 105 and combines it with the Network Offset. The result points to the linked entry in network entry table 170 and the network entry for this flow and protocol is thus obtained in step S148.

Figure 12:
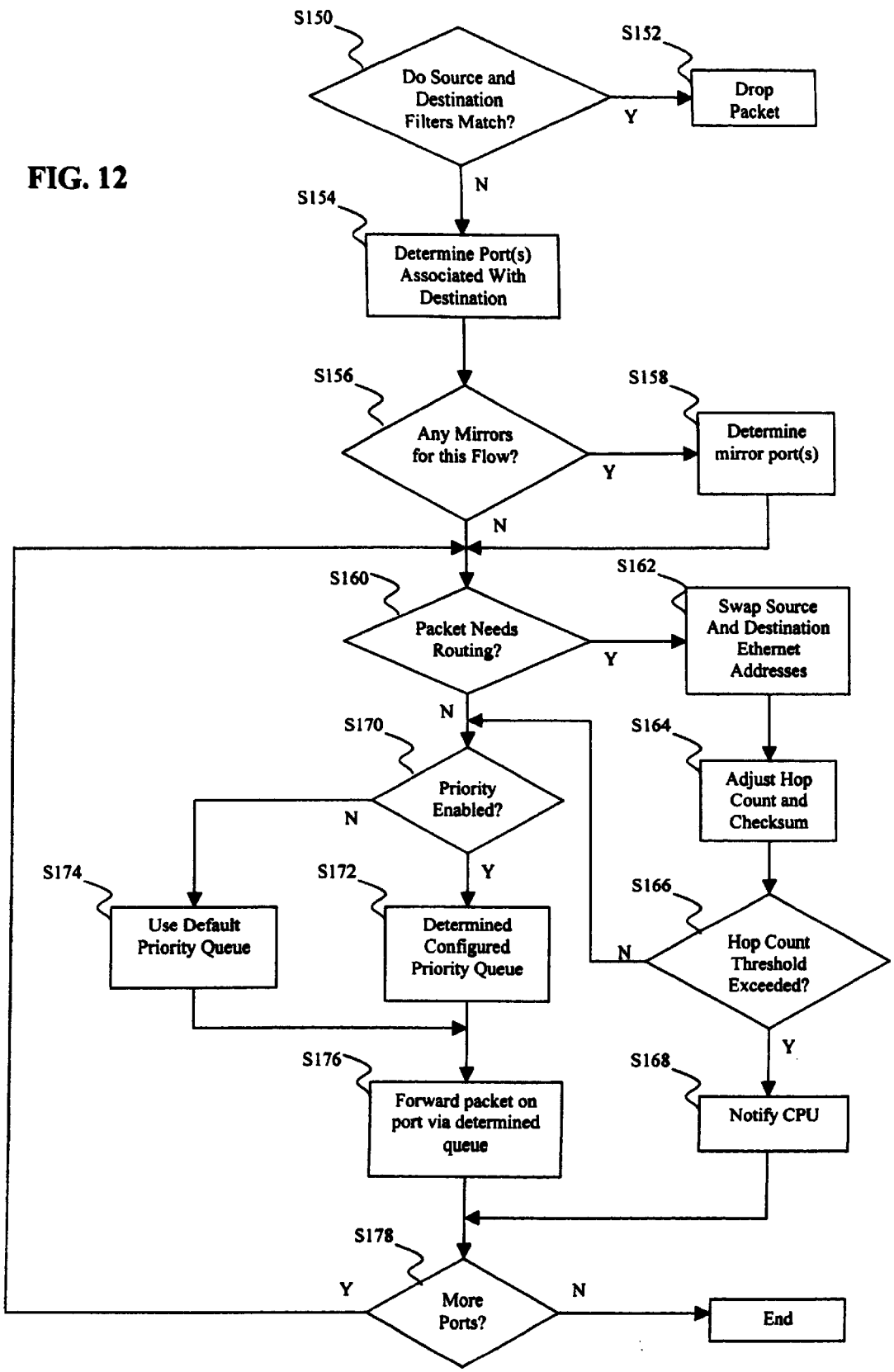
FIG. 12 is a flowchart illustrating a method used to forward data packets according to flow processing information programmed for the particular flow with which the data packets are associated in a multiprotocol switch according to the present invention.

Switch engine processing for forwarding packets according to flow table information in the multiprotocol switch of the present invention, as performed in step S46 of FIG. 8 and step S76 of FIG. 9 for example, is further illustrated in FIG. 12. At this point, flow processing information for both the source and destination sides of the flow have been obtained, as described above in connection with the processing illustrated in FIG. 11.

The filter tag bits for the source and destination, if they are configured (as denoted by the Filter Enable fields of the respective protocol entries), are compared by switch engine 100 (step S150). If they match (i.e., the match bits of the respective filter tags match and the veto bits do not match), then the packet is dropped (S152). Otherwise, processing advances to step S154, where the port associated with the destination is determined from the address resolution record entry for the destination side of the flow. If this is a multicast packet, the port(s) on which the packet should be forwarded is determined from the Broadcast Enable field of the network entry for the destination side of the flow.

In step S156 switch engine 100 determines whether any mirrors have been configured for the flow (as indicated by Mirror Enable bits being set and matching mirror tags for source and destination). If so, these mirror port(s) are determined in step S158.

Packet forwarding processing is performed for each destination port determined in steps S154 and S158. In step S160, switch engine 100 first determines whether the packet needs to be routed to the current destination port. This is done by comparing the contents of the routing domain configuration registers for the source and destination ports. If the source and destination ports are in different routing domains, the packet needs to be routed. In addition, for unicast packets, switch engine 100 compares the destination Ethernet address in the packet with the address of the port on which the packet arrived. If the address matches, then the packet needs to be routed.

For packets that do not need to be routed, processing advances to step S170. For packets to be routed, in step S162, the source address is swapped with the routing domain on which the packet is being forwarded. For unicast packets, the destination Ethernet addresses of the packet is swapped with the address specified in the swap field of the network entry associated with the destination of this flow. The switch engine extracts the hop count from the packet and if the hop count is one or zero for IP or 16 for IPX (as determined in step S166), notifies CPU 80 for further processing (step S168). In addition, switch engine 100 decrements (for IP) or increments (for IPX) the hop count and recomputes the checksum of the packet (for IP packets only) (step S164).

Processing advances to step S170 where, if priority is enabled for the flow (as indicated by the Priority Enable bit in the protocol entry), the priority tags are compared to determine if they match. If so, the Priority Queue field of the destination is determined from the protocol entry associated with the destination of the flow (step S172). Otherwise, a default queue is used (step S174). The packet is then forwarded to the queue determined for this packet and associated with the current destination port (S176). In a service time interval, the queue is serviced the appropriate number of times as specified in priority configuration registers. If this is the last destination port (determined in step S178), packet forwarding processing ends and control branches back to step S12 in FIG. 6.

Figure 13:
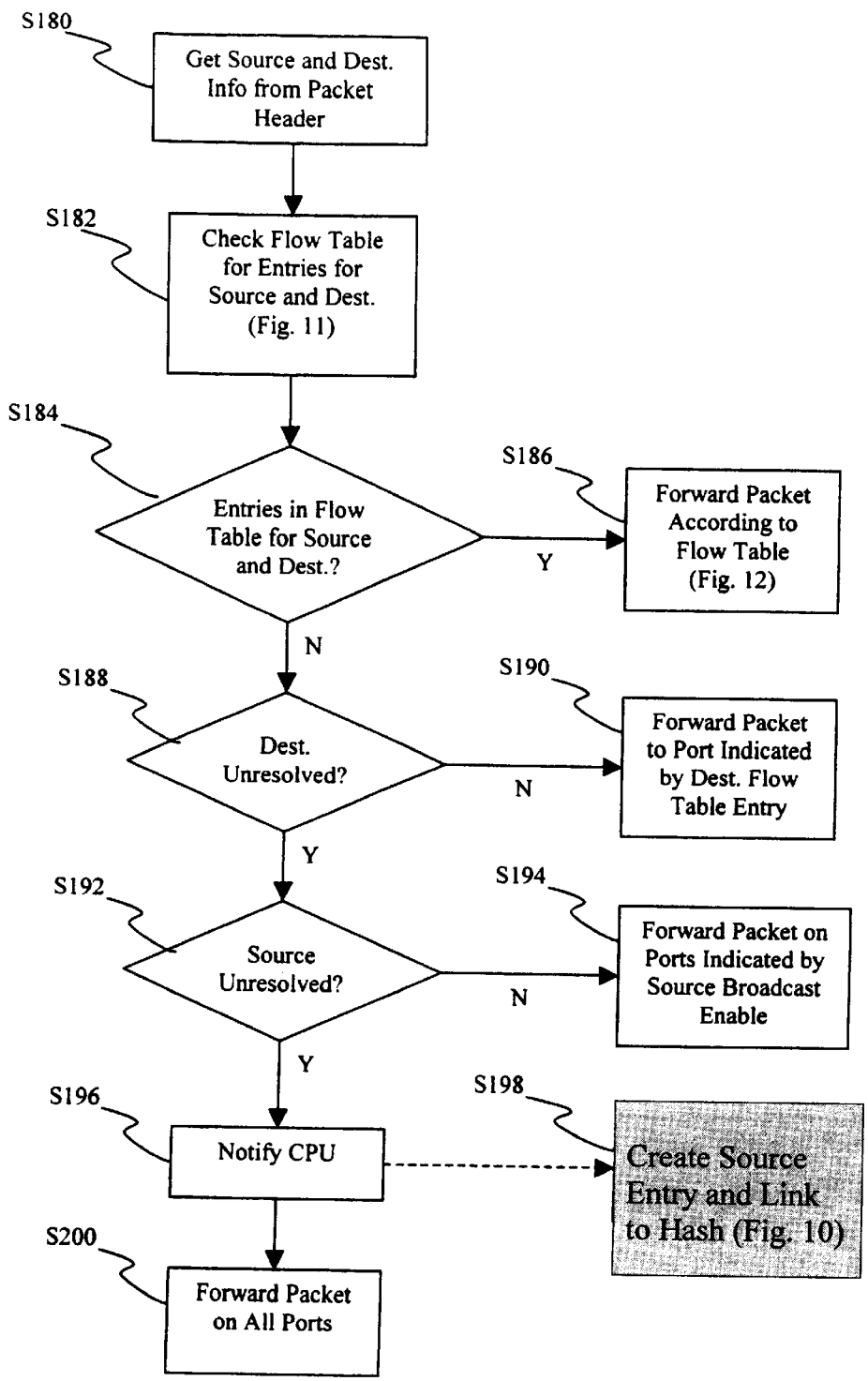
FIG. 13 is a flowchart illustrating a method used to process data packets according to Layer 2 protocols in a multiprotocol switch according to the present invention.

Switch engine processing of Layer 2 packets in the multiprotocol switch of the present invention, as performed in step S26 of FIG. 7 for example, is further illustrated in FIG. 13. Processing steps that are shaded differentiate those which are preferably performed by CPU 80 rather than switch engine 100 in this example of the invention.

Switch engine 100 first extracts the address information for both the source and destination ends of the flow with which the packet is associated (step S180). As described above, this includes extracting the source and destination MAC addresses of the packet.

Switch engine 100 then checks to see whether entries exist in the flow table for both ends of the flow (step S182). If entries exists for both ends of the flow (determined instep S184), the packet is forwarded at wire speed in accordance with any filters, mirrors, priorities or VLANs established in the flow table entry (step S186).

If only the source end of the flow was unresolved (determined in step S188), a flow table entry exists for the destination end of the flow, containing the port associated with the destination, as well as any broadcast enable entries that are useful if the packet is a multicast packet. Accordingly, switch engine 100 forwards the packet on the port(s) indicated by the flow table entry associated with the destination (step S190).

If only the destination end of the flow was unresolved (determined in step S192), a flow table entry exists for the source end of the flow, containing a broadcast enable entry for the source. Accordingly, switch engine 100 forwards the packet on the port(s) indicated by the broadcast enable entry associated with the source (step S194).

If both the source and destination ends of the flow are unresolved (determined in steps S184, S188 and S192), switch engine 100 notifies CPU 80 via CPU interface 110 that the source address of the packet is unresolved (step S196). The message to the CPU contains the source and destination addresses, the port on which the packet arrived, and an indication that the source was unresolved. CPU 80 will then create an entry in flow table 70 containing forwarding information and links to information relating to any previously-configured filters, priorities, mirrors or VLANs corresponding to the source end of the flow (step S198), in a manner described above in connection with FIG. 10.

If it is determined in steps S184, S188 and S192 that both ends of the flow are unresolved, the packet is broadcast on all ports. After the unresolved packet is broadcast or forwarded in steps S194 or, S200, the destination node, if attached to the switch, will respond. The response packet will be processed as described above and a flow table entry for the responding node will be created by the CPU as in step S198. At that point, flow table entries for both ends of the flow will have been created so that any subsequent packets belonging to that flow will be forwarded by switch engine 100 at wire speed.

Figure 14:
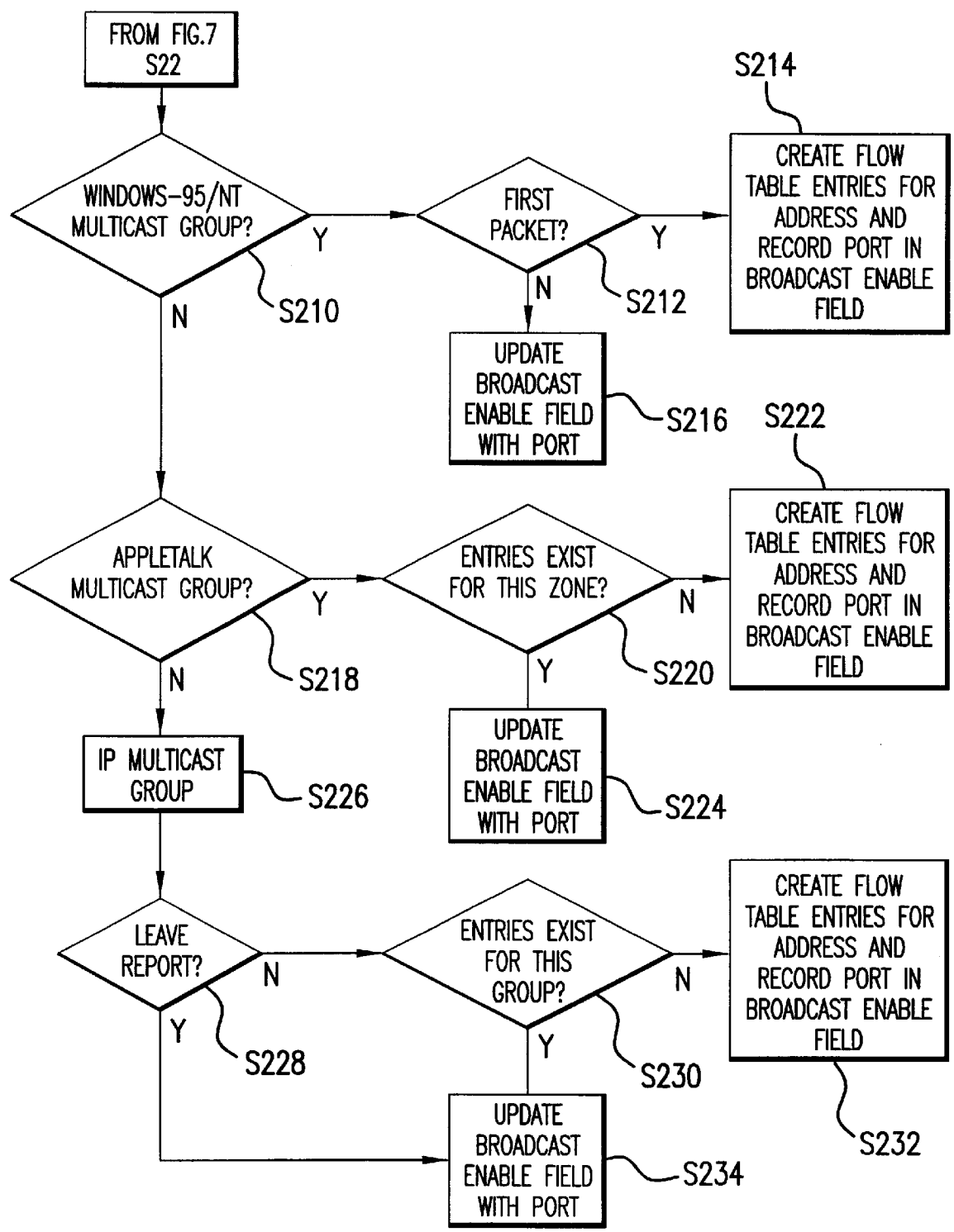
FIG. 14 is a flowchart illustrating a method used to automatically configure and update VLAN information in a multiprotocol switch built according to the present invention.

Automatic VLAN creation and management in accordance with the present invention, as performed in step S24 in the process illustrated in FIG. 7 for example, is further illustrated in FIG. 14.

Switch engine 100 uses the Broadcast Enable field in the network entry to determine the ports on which broadcast or multicast packets from a node associated with that network entry needs to be sent. Every node that belongs to a VLAN has a network entry associated with it, and network entries can be shared by multiple nodes. As described above, the Broadcast Enable field is one of the 32-bit fields in the network entry. A 1 in a bit position of the Broadcast Enable field means that broadcast or multicast packets from that node will be forwarded on that port. A 0 in a bit position of the Broadcast Enable field indicates that broadcast and multicast packets from the node associated with that network entry will not be forwarded on that port. For example, if in the Broadcast Enable field bit position 16 is 1 and 17 is 0, then a broadcast or multicast packet from that node will be sent out on port 17, but not on port 18 of the switch.

If a node is assigned to a VLAN, when a packet first arrives from that node, CPU 80 allocate's a network entry for it (if one does not already exist), determines the ports of the switch on which other members of the VLAN are connected and will put a '1' in bit positions corresponding to those ports (e.g. bit 0 for port 1, bit 1 for port 2, etc.). A node can belong to more than one VLAN and in that case, the Broadcast Enable field will be updated appropriately (e.g. it will be a logical "OR" of the two entries). If the destination address of a packet arriving from a node is a broadcast address, then it will be unresolved and the switch engine will use the source address to perform address resolution and network entry lookup, and then broadcast the packet according to the Broadcast Enable of the source if such an entry exists. If the destination address is a multicast address, then the switch engine uses the destination multicast address to perform address resolution and network entry lookup, and will multicast the packet on ports indicated by the Broadcast Enable field of the source if such an entry exists.

As described above, a VLAN can be manually created by a system administrator by configuring one via software processes executing on CPU 80, information regarding which is consequently stored in VLAN tables 79-1 ... 79-V in configuration table 85. As a further aspect of the invention, however, VLANs can be automatically created, updated and maintained by the switch too correspond to multicast groups instantaneously existing among the hosts connected to ports of the switch. The following automatic VLANs are described below automatic VLANs for nodes using Windows DLC/LLC and NetBios (Windows 95 and Windows NT machines), automatic VLANs for AppleTalk nodes (Apple computers), and automatic VLANs for IP nodes using IP multicasting. It should be noted here that automatic VLAN creation can be disabled by the system administrator by means of setting a flag, for example, in VLAN tables 79-1 ... 79-V. It should be further noted that automatic VLAN creation can be performed for other types of multicast groups in addition to those described below in accordance with the invention.

When switch engine 100 determines in step S22 that the packet is a multicast packet, it sends the packet to CPU 80 for processing. This includes Windows-95/Windows-NT multicast packets, IP multicasts, IGMP reports and queries, and AppleTalk Zone Information Protocol (ZIP) packets.

Windows-95/Windows-NT (trademarks of Microsoft Corp of Redmond Wash) machines using NetBios protocol on the top of DLC/LLC use a multicast address of 03:00:00:00:00:01 to other Windows-95/NT machines. When a packet is sent by Windows-95 clients and NT servers using this address, switch engine 100 forwards will forward this packet to CPU 80 via CPU interface 110 with a message containing the address and the port on which the packet arrived. When CPU 80 receives this message, processing will advance to step S210. CPU 80 checks to see whether an address resolution record entry exists for this address in flow table 70 (step S212). If not, it creates address resolution hash and address resolution record entries for this multicast address and links them together with a network table entry it further creates for it. Since CPU 80 knows one of the ports on which a node using this multicast protocol resides, it sets the bit corresponding to that port in the Broadcast Enable field of the newly created network table entry. For example, if the packet arrived on port 5, then CPU 80 sets bit 4 of the Broadcast Enable field to 1. If an entry already exists, then CPU 80 simply updates the Broadcast Enable field appropriately (for example, if the Broadcast Enable field had a 1 in bit position 5 and if the packet arrived on port 2, then bit 1 of the Broadcast Enable field is also set to 1). The VLAN is automatically built in this manner, one step at a time with no administrator intervention.

If the packet is an AppleTalk packet (determined in step S218), processing advances to step S220. In AppleTalk networks, a rough equivalent of an IP subnetwork is a zone. AppleTalk networks use dynamic node address assignment using a protocol called Apple Address Resolution Protocol (AARP). Addresses of nodes can thus change from time to time. However, names of nodes do not change frequently. AppleTalk Name Binding Protocol (NBP) provides a mechanism for translating names into addresses. One such name to address mapping function involves maintaining a mapping between networks and zone names. This is done in AppleTalk routers through Zone Information Protocol (ZIP). Refer to G. S. Sidhu et al., "Inside AppleTalk," pp. 8-1 through 8-24, for more details regarding this protocol.

Zone Information Protocol (ZIP) provides for the following services: maintenance of network-to-zone-name mapping of the internet; support for selection of a zone name by a node at startup; and support for various commands that may be needed by non-router nodes to obtain this mapping. During startup, an AppleTalk node acquires the name of the zone it belongs to. It can either ask the router to put it in a specific zone or it can ask the router to place it in any zone. This is done through ZIP GetNetinfo requests and responses. A datalink multicast address called zone multicast address is associated with a given zone name on a given data link and is determined by the ZIP process in AppleTalk routers. All the nodes that belong to a particular zone use that multicast address instead of a broadcast address.

Switch engine 100 snoops AppleTalk ZIP packets by detecting GetNetInfo responses and ZIP Notify packets. These packets contain the multicast address associated with the zone. When such packets are detected in step S22, they are forwarded to CPU 80 and processing advances to step S220, where CPU 80 checks to see whether flow table entries exist for the multicast address for the zone. If not, it creates an entry for it and automatically adds the sender (which in this case would be the AppleTalk router) and the receiver (which is the end node) to a VLAN based on this multicast address provided that automatic VLAN creation is not disabled. This is done by (step S222) creating an address resolution hash and address resolution record entries for the multicast address if such do not exist already, creating and linking a network table entry thereto, and updating the Broadcast Enable field in the network entry so that subsequent packets addressed to this multicast address are forwarded on the ports which contain these nodes (sender and receiver) by switch engine 100 at wire speed. If it is determined in step S220 that flow table entries already exist for the zone associated with the multicast address, CPU 80 updates the Broadcast Enable field appropriately if necessary.

If the packet is an IP multicast packet, processing advances to step S226. VLANs based on IP multicast groups are established using IGMP and IP multicast protocols. The multiprotocol switch of the present invention performs IGMP spoofing in hardware and automatically determines the IP multicast groups to which the nodes attached to the switch belong. The switch creates a VLAN for every IP multicast group. The switch also automatically determines the membership of each multicast group associated with hosts attached to the switch and maintains the VLAN accordingly. Thus, IP multicast frames will be forwarded only on segments with users registered to receive them so that segments without group members are spared of spurious traffic.

Class D IP addresses (in the range of 224.0.0.0 through 239.255.255.255) are used for IP multicast networks (refer to RFC 1112 for more details). IP multicast addresses are resolved in a manner identical to Ethernet multicast addresses (i.e. the destination address is used to perform address lookup). Internet Group Management Protocol (IGMP) as described in RFC 1112 is used for IP multicast group administration. IGMP uses IP datagrams as shown in figure below. If the protocol carried field in the IP header is 2, then the data following the IP header contains IGMP packet. Switch engine 100 detects IGMP packets in step S22 and passes them along to CPU 80 as described above.

| IGMP type (4 bits) | IGMP version (4 bits) | Unused (8 bits) | Checksum (16 bits) |
|---|---|---|---|
| Class D IP Muiticast Group Address (32 bits) | | | |

There are only two types of IGMP messages: reports and queries. End stations send reports to join or maintain membership in a multicast group. Routers send queries to locate active group members. As described above in connection with FIG. 6, the multiprotocol switch of the present invention, on powerup, joins the "all hosts" multicast group (224.0.0.1) and periodically sends out IGMP queries to the "all hosts" multicast address to determine all the multicast groups that are active on its segments. The group address in this query is set to 0.0.0.0 to indicate that the switch is interested in all active IP multicast groups. When a node receives the query, it will respond with a report indicating the multicast group it belongs to. Nodes also send IGMP reports when they leave the multicast group. During the time a node belongs to a multicast group, all messages it sends to other members of the group are addressed with the IP multicast group address.

Switch engine 100 forwards all IGMP reports and IP messages sent to IP multicast addresses to CPU 80 (step S22). In step S228, CPU 80 first determines whether the message is an IGMP report indicating that a node is leaving an existing group. If not, CPU 80 determines whether if low table entries exist for the multicast group associated with the IP multicast address (either indicated within an IGMP report or contained as the destination address of the packet) (step S230). If not, CPU 80 creates (step S232) or updates (step S234) the VLAN for this IP multicast address, provided that automatic VLAN creation is not disabled. This is done by creating address resolution hash and address resolution record entries for that IP multicast address (if one has not already been created), creating a network table entry and linking it to the address resolution record entry (if not done already), and updating the Broadcast Enable field. Thereafter, multicast packets from nodes in the IP multicast group using that multicast address as a destination are forwarded on all the other ports which have nodes that belong to that IP multicast group at wire speed by switch engine 100. If the packet is an IGMP report indicating that a node is leaving the multicast group, CPU 80 retrieves the network entry associated with that multicast group and clears the bit corresponding to the port on which that node is connected.

Although the present invention has been described in detail hereinabove with reference to the preferred embodiments thereof, those skilled in the art will appreciate that various substitutions and modifications can be made to the examples provided while remaining within the spirit and scope of the invention as defined in the appended claims. For example, many processing steps have been described that could be ordered or grouped together differently for efficiency, or could be performed in parallel depending on implementation. Those skilled in the art will realize that such different implementations are possible after being taught by the present invention. Accordingly, the examples of the invention provided herein should be seen as illustrative rather than limiting.

I claim:

1. A method for forwarding data packets in a switch having a plurality of ports, said ports being adapted to transmit and receive data packets from hosts coupled thereto, said method comprising:

receiving a first data packet at a first port;

firstly extracting flow identification information from said first data packet, said flow identification information indicating that said first data packet belongs to a first flow between certain of said hosts;

corresponding said flow identification information with stored configuration information;

creating flow processing information based on said corresponding stored configuration information, said flow processing information comprising at least one of a filter, a mirror, and a priority, said flow processing information further indicating at least a second port, wherein all data packets belonging to said first flow are forwarded between said first and second ports, said first and second ports being associated with said certain hosts;

storing a first record in a flow table containing said flow processing information;

receiving a second data packet at one of said first and second ports;

secondly extracting said flow identification information from said second data packet;

locating said stored first record in said flow table based on said extracted flow identification information; and preparing to forward said second data packet to the other of said first and second ports based on said flow processing information contained in said stored first record, wherein said steps of firstly and secondly extracting said flow identification information each includes:

determining a protocol associated with said first flow;

if said protocol is IP or IPX, extracting Layer 3 header information as said flow identification information; and if said protocol is not IP or IPX, extracting Layer 2 header information as said flow identification information.

2. A method as defined in claim 1, further comprising:

preventing said second data packet from being forwarded to the other of said first and second ports in accordance with said filter.

3. A method as defined in claim 1, further comprising:

forwarding said second data packet to the other of said first and second ports; and forwarding said second data packet on certain other of said ports in accordance with said mirror.

4. A method as defined in claim 1, further comprising:

forwarding said second data packet to the other of said first and second ports; and prioritizing transmission of said second data packet to hosts associated with the other of said first and second ports in accordance with said priority.

5. A method of forwarding data packets between a plurality of switch ports, said method comprising:

receiving a data packet at one of said switch ports;

corresponding flow identification information in said data packet with stored flow processing information, said flow identification information including source and destination addresses, source and destination sockets, and a protocol, said stored flow processing information including a destination port, a filter tag and a broadcast enable, said corresponding including:

locating an address resolution hash record in an address resolution hash table according to a portion of said flow identification information, said address resolution hash record storing a link to an address resolution record;

locating said address resolution record in an address resolution record table in accordance with said address resolution hash record, said address resolution record storing said destination port and a link to a protocol entry;

locating said protocol entry in a protocol entry table in accordance with said address resolution record and said protocol, said protocol entry storing a link to said filter tag and a link to a network entry;

locating said network entry in a network entry table according to said protocol entry, said network entry storing said broadcast enable; and locating said filter tag in a list of filter tags in accordance with said protocol entry; and forwarding said data packet in accordance with said stored flow processing information.

6. A method according to claim 5, wherein said stored flow processing information further includes a priority, said protocol entry further storing said priority.

7. A method according to claim 5, further comprising alerting a CPU if no stored flow processing information corresponds to said flow identification information of said data packet.

8. A method of forwarding data packets between a plurality of switch ports, said method comprising:

receiving a data packet at one of said switch ports;

corresponding flow identification information in said data packet with stored flow processing information, said flow identification information including source and destination addresses, source and destination sockets, and a protocol, said stored flow processing information including a destination port, a filter tag and a broadcast enable, said corresponding including:

locating an address resolution hash record in an address resolution hash table according to a portion of said flow identification information, said address resolution hash record storing a link to an address resolution record;

locating said address resolution record in an address resolution record table in accordance with said address resolution hash record, said address resolution record storing said destination port and a link to a protocol entry;

locating said protocol entry in a protocol entry table in accordance with said address resolution record and said protocol, said protocol entry storing a link to said filter tag and a link to a network entry;

locating said network entry in a network entry table according to said protocol entry, said network entry storing said broadcast enable; and locating said filter tag in a list of filter tags in accordance with said protocol entry; and forwarding said data packet in accordance with said stored flow processing information, wherein said stored flow processing information further includes a mirror tag, said protocol entry further storing a link to said mirror tag, said method further comprising locating said mirror tag in a list of mirror tags in accordance with said protocol entry.

9. A method of forwarding data packets between a plurality of switch ports, said method comprising:

receiving a data packet at one of said switch ports;

corresponding flow identification information in said data packet with stored flow processing information, said flow identification information including source and destination addresses, source and destination sockets, and a protocol, said stored flow processing information including a destination port, a filter tag and a broadcast enable, said corresponding including:

locating an address resolution hash record in an address resolution hash table according to a portion of said flow identification information, said address resolution hash record storing a link to an address resolution record;

locating said address resolution record in an address resolution record table in accordance with said address resolution hash record, said address resolution record storing said destination port and a link to a protocol entry;

locating said protocol entry in a protocol entry table in accordance with said address resolution record and said protocol, said protocol entry storing a link to said filter tag and a link to a network entry;

locating said network entry in a network entry table according to said protocol entry, said network entry storing said broadcast enable; and locating said filter tag in a list of filter tags in accordance with said protocol entry; and forwarding said data packet in accordance with said stored flow processing information, wherein said stored flow processing information further includes address swapping bits, said network entry further storing said address swapping bits.

10. A method of forwarding data packets between a plurality of switch ports, said method comprising:

receiving a data packet at one of said switch ports;

corresponding flow identification information in said data packet with stored flow processing information, said flow identification information including source and destination addresses, source and destination sockets, and a protocol, said stored flow processing information including a destination port, a filter tag and a broadcast enable, said corresponding including:

locating an address resolution hash record in an address resolution hash table according to a portion of said flow identification information, said address resolution hash record storing a link to an address resolution record;

locating said address resolution record in an address resolution record table in accordance with said address resolution hash record, said address resolution record storing said destination port and a link to a protocol entry;

locating said protocol entry in a protocol entry table in accordance with said address resolution record and said protocol, said protocol entry storing a link to said filter tag and a link to a network entry;

locating said network entry in a network entry table according to said protocol entry, said network entry storing said broadcast enable; and locating said filter tag in a list of filter tags in accordance with said protocol entry; and forwarding said data packet in accordance with said stored flow processing information, wherein said forwarding step includes routing said data packet to another network by swapping said source and destination addresses of said data packet in accordance with said address swapping bits.

11. An apparatus for forwarding data packets in a switch having a plurality of ports, said ports being adapted to transmit and receive data packets from hosts coupled thereto, said apparatus comprising:

means for receiving a first data packet at a first port;

means for firstly extracting flow identification information from said first data packet, said flow identification information indicating that said first data packet belongs to a first flow between certain of said hosts;

means for corresponding said flow identification information with stored configuration information;

means for creating flow processing information based on said corresponding stored configuration information, said flow processing information comprising at least one of a filter, a mirror, and a priority, said flow processing information further indicating at least a second port, wherein all data packets belonging to said first flow are forwarded between said first and second ports, said first and second ports being associated with said certain hosts;

means for storing a first record in a flow table containing said flow processing information;

means for receiving a second data packet at one of said first and second ports;

means for secondly extracting said flow identification information from said second data packet;

means for locating said stored first record in said flow table based on said extracted flow identification information; and means for preparing to forward said second data packet to the other of said first and second ports based on said flow processing information contained in said stored first record, wherein said means for firstly and secondly extracting said flow identification information each includes:

means for determining a protocol associated with said first flow;

means, operative if said protocol is IP or IPX, for extracting Layer 3 header information as said flow identification information; and means, operative if said protocol is not IP or IPX, for extracting Layer 2 header information as said flow identification information.

12. An apparatus as defined in claim 11, further comprising:

means for preventing said second data packet from being forwarded to the other of said first and second ports in accordance with said filter.

13. An apparatus as defined in claim 11, further comprising:

means for forwarding said second data packet to the other of said first and second ports; and means for forwarding said second data packet on certain other of said ports in accordance with said mirror.

14. An apparatus as defined in claim 11, further comprising:

means for forwarding said second data packet to the other of said first and second ports; and means for prioritizing transmission of said second data packet to hosts associated with the other of said first and second ports in accordance with said priority.

\* \* \* \* \*